: (12) United States Patent
Matsubayashi et al.

(10) Patent No.: US 9,624,398 B2
(45) Date of Patent: Apr. 18, 2017

(54) ANTISTATIC RELEASE AGENT AND ANTISTATIC RELEASE FILM

(71) Applicants: SHIN-ETSU POLYMER CO., LTD., Tokyo (JP); SHIN-ETSU CHEMICAL CO., LTD, Tokyo (JP)

(72) Inventors: Sou Matsubayashi, Saitama (JP); Kohei Kanto, Saitama (JP); Kazuyoshi Yoshida, Saitama (JP); Kenji Yamamoto, Annaka (JP); Shinji Irifune, Annaka (JP)

(73) Assignees: SHIN-ETSU POLYMER CO., LTD., Tokyo (JP); SHIN-ETSU CHEMICAL CO., LTD., Tokyo (JP)

( * ) Notice: Subject to any disclaimer, the term of this patent is extended or adjusted under 35 U.S.C. 154(b) by 160 days.

(21) Appl. No.: 14/426,107

(22) PCT Filed: Sep. 5, 2013

(86) PCT No.: PCT/JP2013/073928
§ 371 (c)(1),
(2) Date: Mar. 4, 2015

(87) PCT Pub. No.: WO2014/038626
PCT Pub. Date: Mar. 13, 2014

(65) Prior Publication Data
US 2015/0218410 A1 Aug. 6, 2015

(30) Foreign Application Priority Data
Sep. 5, 2012 (JP) ................................ 2012-195440

(51) Int. Cl.
*H01B 1/00* (2006.01)
*C09D 141/00* (2006.01)
*C08L 83/04* (2006.01)
*C09J 7/02* (2006.01)
*C09D 5/24* (2006.01)
*C08G 77/16* (2006.01)
*C08G 77/18* (2006.01)

(52) U.S. Cl.
CPC ............ *C09D 141/00* (2013.01); *C08L 83/04* (2013.01); *C09D 5/24* (2013.01); *C09J 7/0225* (2013.01); *C08G 77/16* (2013.01); *C08G 77/18* (2013.01)

(58) Field of Classification Search
CPC ......... C09J 7/022; C09J 7/0225; C08G 77/04; C08G 77/12; C08G 77/14; C08G 77/18; C08G 77/16; C09D 141/00; C09D 5/24; C08L 83/04
See application file for complete search history.

(56) References Cited

U.S. PATENT DOCUMENTS

| | | | |
|---|---|---|---|
| 5,958,834 A | 9/1999 | Yamazaki et al. | |
| 2003/0107026 A1* | 6/2003 | Fujiki | C08G 65/007 252/500 |
| 2007/0108420 A1 | 5/2007 | Kuramoto | |
| 2008/0260981 A1* | 10/2008 | Mogi | B29C 33/405 428/36.8 |
| 2010/0168313 A1* | 7/2010 | Mizuno | C09J 183/04 524/500 |
| 2010/0188802 A1* | 7/2010 | Yoshida | C08G 61/124 361/525 |
| 2011/0111217 A1* | 5/2011 | Kuroda | C09J 7/0207 428/339 |
| 2012/0045635 A1* | 2/2012 | Aoki | C09J 183/04 428/220 |
| 2012/0202055 A1* | 8/2012 | Kataoka | C09J 7/0296 428/336 |
| 2012/0328863 A1* | 12/2012 | Kuo | C09J 183/04 428/220 |
| 2013/0096257 A1* | 4/2013 | Yamamoto | C09D 183/04 524/860 |
| 2014/0004360 A1* | 1/2014 | Takahira | C09J 7/0228 428/447 |
| 2014/0342166 A1* | 11/2014 | Yang | C09D 183/04 428/447 |
| 2014/0378608 A1* | 12/2014 | Yang | C09D 183/04 524/588 |

FOREIGN PATENT DOCUMENTS

CN 1827694 A 9/2006
CN 1840599 A 10/2006
(Continued)

OTHER PUBLICATIONS

International Search Report for corresponding PCT/JP2013/073928, dated Dec. 10, 2013.
(Continued)

*Primary Examiner* — Mark Kopec
*Assistant Examiner* — Jaison Thomas
(74) *Attorney, Agent, or Firm* — Lando & Anastasi, LLP

(57) ABSTRACT

The invention relates to an antistatic release agent comprising: a release component that contains a condensation-curing type organopolysiloxane, a conductive component that contains a complex of a π-conjugated electrically conductive polymer and a polyanion and an organic solvent, wherein the amount of the conductive component relative to 100 parts by mass of the release component is 1 to 300 parts by mass, at least one amine-type compound selected from the group consisting of a secondary amine, a tertiary amine or a quaternary ammonium salt is coordinated to or bonded to portion of anion groups in the polyanion as an ion pair, and the amine-type compound has one or more substituent selected from the group consisting of an alkyl group having 4 or more carbon atoms, an aryl group, an aralkyl group, an alkylene group, an arylene group, an aralkylene group and an oxyalkylene group.

16 Claims, No Drawings

(56) References Cited

FOREIGN PATENT DOCUMENTS

| | | |
|---|---|---|
| CN | 101023138 A | 8/2007 |
| CN | 101041764 A | 9/2007 |
| CN | 101928545 A | 12/2010 |
| JP | 3-039379 | 2/1991 |
| JP | 2636968 B2 | 8/1997 |
| JP | 10-217623 | 8/1998 |
| JP | 2002-241613 A | 8/2002 |
| JP | 2006-249303 A | 9/2006 |
| JP | 2007-254730 A | 10/2007 |
| JP | 2008-045061 A | 2/2008 |
| JP | 2010-006079 A | 1/2010 |
| JP | 2011-032382 A | 2/2011 |
| JP | 2012-031256 | 2/2012 |
| TD | 101220206 A | 7/2008 |
| WO | 2005/052058 A1 | 6/2005 |
| WO | 2012091451 A2 | 7/2012 |

OTHER PUBLICATIONS

Office Action dated Dec. 10, 2015, in corresponding CH 201380045945.9.
European Search Report dated Jan. 4, 2016, in corresponding EP 13835466.7.
Office Action dated Mar. 16, 2016 for corresponding KR 10-2015-7004749.

* cited by examiner

US 9,624,398 B2

ANTISTATIC RELEASE AGENT AND ANTISTATIC RELEASE FILM

CROSS-REFERENCE TO RELATED APPLICATIONS

This application is a U.S. national stage application and claims the benefit under 35 U.S.C. §371 of PCT/JP2013/073928, titled ANTISTATIC RELEASE AGENT AND ANTISTATIC RELEASE FILM, filed Sep. 5, 2013, which claims priority to Japanese Patent Application No. 2012-195440, filed Sep. 5, 2012, titled, ANTISTATIC RELEASE AGENT AND ANTISTATIC RELEASE FILM, which patent applications are hereby incorporated herein by reference in their entireties for all purposes.

TECHNICAL FIELD

The present invention relates to an antistatic release agent having antistatic properties and an antistatic release film.

Priority is claimed on Japanese Patent Application No. 2012-195440, filed on Sep. 5, 2012, the content of which is incorporated herein by reference.

BACKGROUND ART

Substrates in which a silicone-based release agent is coated onto the surface of a substrate such as a plastic film or paper are widely used as release films.

However, the aforementioned substrates are easily charged, and tend to become even more easily charged when coated with a silicone-based release agent. Consequently, there has been a need to impart antistatic properties to these release films.

Although ionic conductive compounds such as surfactants have been widely used in the past as antistatic agents, since the conductivity of ionic conductive compounds is dependent on humidity, the antistatic properties thereof are unstable, while also having the problem of bleeding out from release films. Therefore, use of $\pi$-conjugated electrically conductive polymers, in which electrical conductivity is not dependent on humidity and which do not cause bleed-out, as antistatic agents for imparting antistatic properties to release films is known.

$\pi$-conjugated electrically conductive polymers are substances that are insoluble and infusible, and cannot be applied to coating or extrusion lamination. Therefore, Patent Document 1 discloses a liquid dispersion of a $\pi$-conjugated electrically conductive polymer in which a polyanion is added as a dopant and surfactant.

However, higher definition levels have come to be required by displays in recent years, and further improvement of mounting speed has come to be required in the field of component mounting in particular. Consequently, there is a growing need for protective films used in optical applications and antistatic base materials used for electronic and electrical components.

In response to these needs, Patent Document 2 proposes a release film that uses an addition curing-type silicone emulsion and a release agent containing a thiophene-based electrically conductive polymer. However, adhesion property of emulsion-type silicone relative to a substrate is low. Since, a large amount of water is contained in the emulsion-type silicone, corrosion of the coating machine may occur. Therefore, there is a difficulty for the emulsion-type silicone to use in an antistatic release film.

An antistatic release film has been known, in which an antistatic layer containing metal nanoparticles and a $\pi$-conjugated electrically conductive polymer is laminated on a substrate and a release agent layer containing silicone resin is laminated on the antistatic layer.

However, in the case, the antistatic layer and the release agent layer are formed independently, and hence, a plurality of coating operation is required, which lead to increase production cost. In the case of using metal nanoparticles, haze of antistatic layer tends to be increased, which is unsuitable for optical use.

Silicone has low hydrophilicity, and hence, it hardly dissolves in aqueous dispersion containing a complex of a $\pi$-conjugated electrically conductive polymer and a polyanion. A non-aqueous electrically conductive dispersion is proposed instead of the aqueous dispersion.

As the non-aqueous electrically conductive dispersion, organic solvent solution of polyaniline is disclosed in Patent Document 3.

In Patent Documents 4 to 6, an organic solvent dispersion is disclosed, in which the water contained in the aqueous dispersion containing a $\pi$-conjugated electrically conductive polymer and a polyanion is changed to an organic solvent.

In Patent Document 7, an organic solvent dispersion is disclosed, which is prepared by freeze-drying aqueous dispersion containing a $\pi$-conjugated electrically conductive polymer and a polyanion, and dissolving the residue in an organic solvent.

PRIOR ART DOCUMENTS

Patent Documents

[Patent Document 1] Japanese Patent Publication No. 2636968

[Patent Document 2] Japanese Unexamined Patent Application, First Publication No. 2002-241613

[Patent Document 3] International Publication No. 2005/052058

[Patent Document 4] Japanese Unexamined Patent Application, First Publication No. 2006-249303

[Patent Document 5] Japanese Unexamined Patent Application, First Publication No. 2007-254730

[Patent Document 6] Japanese Unexamined Patent Application, First Publication No. 2008-045061

[Patent Document 7] Japanese Unexamined Patent Application, First Publication No. 2011-032382

DISCLOSURE OF THE INVENTION

Problems to be Solved by the Invention

Although the mixture obtainable by mixing an organic solvent solution disclosed in Patent Document 3 and silicone-based release agent is dissolved depending on the type of solvent, when drying, the silicone-based release agent and a complex composed of a $\pi$-conjugated electrically conductive polymer and a polyanion are separated. As a result, desirable antistatic properties and release properties cannot be obtained.

In the case where an organic solvent dispersion disclosed in Patent Documents 4 to 6 and silicone-based release agent are simply mixed, the silicone-based release agent and a complex composed of a $\pi$-conjugated electrically conductive polymer and a polyanion are not compatible. As a result, there is a difficulty in obtaining desirable antistatic properties and release properties.

Furthermore, in general, hydrosilylation reaction is employed to cure silicone. However, In Patent Documents 4 to 7, although an organic solvent dispersion and a silicone-based release agent are mixed and then heated, the silicone is not cured and a release agent layer cannot be formed.

An object of the present invention is to provide an antistatic release agent and an antistatic release film having superior antistatic properties and release properties.

Means for Solving the Problems

An antistatic release agent according to the first aspect of the present invention includes: a release component that contains a condensation-curing type organopolysiloxane; a conductive component that contains a complex of a π-conjugated electrically conductive polymer and a polyanion; and an organic solvent, wherein the amount of the conductive component relative to 100 parts by mass of the release component is 1 to 300 parts by mass, at least one amine-type compound selected from the group consisting of a secondary amine, a tertiary amine or a quaternary ammonium salt is coordinated to or bonded to portion of anion groups in the polyanion as an ion pair, and the amine-type compound has one or more substituent selected from the group consisting of an alkyl group having 4 or more carbon atoms, an aryl group, an aralkyl group, an alkylene group, an arylene group, an aralkylene group and an oxyalkylene group.

An antistatic release film according to the second aspect of the present invention includes: a base composed of a plastic film or paper; and a release agent layer formed on at least one surface of the base, wherein the release agent layer is formed from the antistatic release agent.

Effects of the Invention

The antistatic release agent and antistatic release film of the present invention have superior antistatic properties and release properties.

Mode for Carrying Out the Invention

<Antistatic Release Agent>
(Release Component)

A release component contained in the antistatic release agent of the first aspect of the invention contains a condensation-curing type organopolysiloxane. Specifically the release component is a silicone-based material that contains at least one composition selected from the group consisting of compositions (A) to (C) shown below, and is curable by condensation reaction.

(A): a composition (A) that includes components (A-1) to (A-3) shown below.
Component (A-1): organopolysiloxane having at least two hydroxyl groups within one molecule thereof
Component (A-2): organopolysiloxane having at least three SiH groups within one molecule thereof
Component (A-3): condensation catalyst
(B): a composition (B) that includes components (B-1) to (B-3) shown below.
Component (B-1): organopolysiloxane having at least two hydroxyl groups within one molecule thereof
Component (B-2): organopolysiloxane having at least three hydrolyzable groups within one molecule thereof
Component (B-3): condensation catalyst (C): a composition (C) that includes components (C-1) and (C-2) shown below. Component (C-1): organopolysiloxane having at least three hydrolyzable groups within one molecule thereof
Component (C-2): condensation catalyst Each of the component (A-1) and component (B-1) is an organopolysiloxane having at least two hydroxyl groups bonded directly to silicon atoms within one molecule thereof. The monovalent organic group other than hydroxyl group bonded directly to silicon atoms is not particularly limited, and specific examples thereof include a monovalent organic group having 1 to 10 carbon atoms, for example, alkyl groups such as a methyl group, an ethyl group, a propyl group, and a butyl group; cycloalkyl groups such as a cyclopentyl group, and a cyclohexyl group; aryl groups such as a phenyl group, and a naphthyl group; alkenyl groups such as a vinyl group, and a propenyl group. In the present invention, it is particularly preferable that 80 mol % or more of organic groups other than hydroxyl group is a methyl group. The molecular structure is also not particularly limited, in basically, a linear structure is preferable in industrial perspective, but a branched structure can be also used.

The viscosity of 30% by mass toluene solution of the organopolysiloxane as a component (A-1) or component (B-1), determined using a rotating viscometer at 25° C., is preferably 50 mPa·s or more, and more preferably 50 to 100,000 mPa·s, and still more preferably 100 to 40,000 mPa·s.

As specific examples of the components (A-1) and (B-1), organopolysiloxanes represented by general formulae (1-1), (1-2) and (1-3) can be mentioned. In the formulae, R represents a hydroxyl group, a monovalent hydrocarbon group having 1 to 20 carbon atoms, for example, an alkyl group such as a methyl group, an ethyl group, a propyl group, or a butyl group; a cycloalkyl group such as a cyclopentyl group, or a cyclohexyl group; an aryl group such as a phenyl group, or a naphthyl group; an alkenyl group such as a vinyl group, or a propenyl group, and siloxane residue represented by general formula (2-1) or (2-2). In the formulae (2-1) and (2-2), $R^1$ represents an oxygen atom or an alkylene group having 1 to 6 carbon atoms. As the alkylene group having 1 to 6 carbon atoms, a methylene group and an ethylene group can be mentioned. R is the same as above. α1 represents an integer of 0 to 1,000, and preferably an integer of 0 to 900. β1 represents an integer of 50 to 9,000, and preferably an integer of 60 to 900. α2 represents an integer of 0 to 900, and β2 represents an integer of 0 to 9,000. γ represents an integer of 1 to 3,000, and more preferably 1 to 2,000. In the formulae, a plurality of R may be the same or different, provided that, the organopolysiloxanes represented by general formulae (1-1), (1-2) and (1-3) have two or more hydroxyl groups in one molecule thereof. Among these, organopolysiloxanes represented by general formulae (1-1) and (1-3) are preferable. The main skeleton except the structural units (dimethylhydroxysilyl group) at both terminals thereof preferably contains 70 to 100 mol % of dimethylsiloxane unit, 0 to 30 mol % of diphenylsiloxane unit, and 0 to 10 mol % of hydroxymethylsiloxane unit, relative to the total mole number of structural unit constituting the main skeleton; more preferably contains 80 to 100 mol % of dimethylsiloxane unit, 0 to 20 mol % of diphenylsiloxane unit, and 0 to 5 mol % of hydroxymethylsiloxane unit; and still more preferably contains 90 to 100 mol % of dimethylsiloxane unit and 0 to 10 mol % of diphenylsiloxane unit.

[Chemical Formula 1]

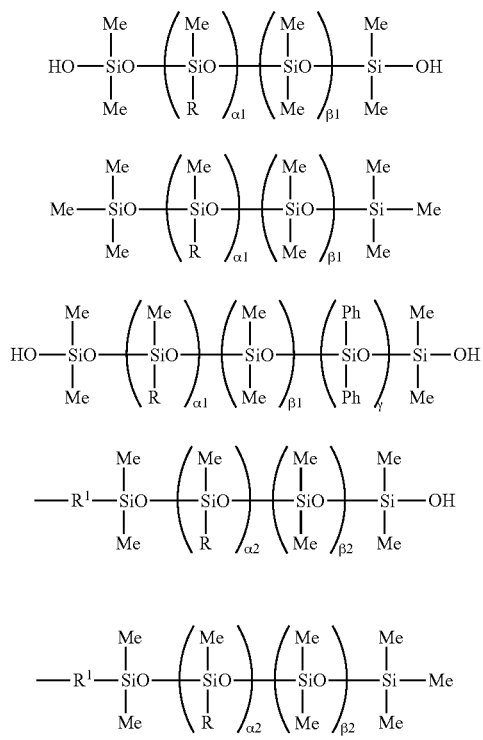

(1-1)
(1-2)
(1-3)
(2-1)
(2-2)

In the formulae, Me represents a methyl group, and Ph represents a phenyl group.

The number of hydroxyl groups within one molecule of the component (A-1) or (B-1) is preferably 2 to 50, and still more preferably 2 to 20.

As specific examples of the component (A-2), organohydrogenpolysiloxane can be mentioned, and specific examples thereof include a polymer of methylhydrogenpolysiloxane; a copolymer of methylhydrogenpolysiloxane and dimethylpolysiloxane; a copolymer of methylhydrogenpolysiloxane and methylphenylpolysiloxane; a copolymer of methylhydrogenpolysiloxane, dimethylpolysiloxane and methylphenylpolysiloxane; and a copolymer of methylhydrogenpolysiloxane, dimethylpolysiloxane and diphenylpolysiloxane.

The organohydrogenpolysiloxane usable as a component (A-2) of the present invention is not particularly limited, as long as it has at least three hydrogen atoms bonded directly to silicon atoms in the molecule thereof, more preferably 4 to 1,000 hydrogen atoms, still more preferably 4 to 200 hydrogen atoms. The molecular structure may be linear, branched or cyclic. The absolute viscosity of the organohydrogenpolysiloxane as a component (A-2) of the present invention, determined using a rotating viscometer at 25° C. may be several mPa·s to several tens of thousands mPa·s, preferably 2 to 1,000 mPa·s, still more preferably 5 to 300 mPa·s.

Specific examples of organohydrogenpolysiloxane include the compounds represented by general formulae (3-1) to (3-5) shown below.

[Chemical Formula 2]

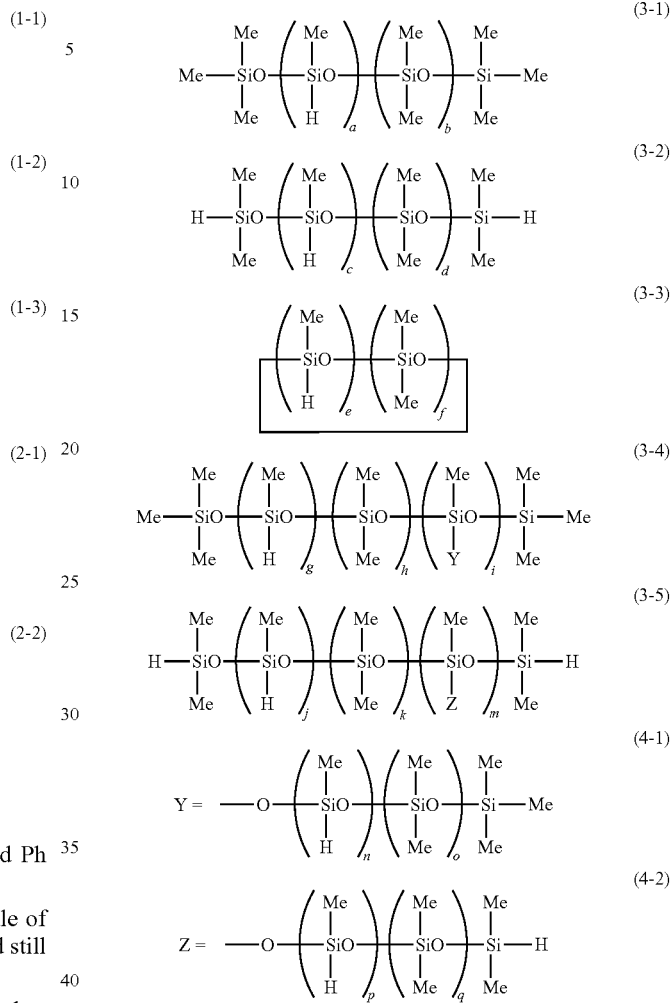

(3-1)
(3-2)
(3-3)
(3-4)
(3-5)
(4-1)
(4-2)

Provided that, in the structural formulae and compositional formulae, Me represents a methyl group, Y and Z are groups represented by general formulae (4-1) and (4-2), respectively. Each of "a" to "p" is a number such that one molecule contains three or more SiH groups and is an integer within the range as follows.

"a" and "e" each independently represents an integer of 3 to 500, and preferably an integer of 4 to 500. "c" represents an integer of 1 to 500, and preferably an integer of 2 to 400. "b" "d", "f", "g", "h", "i", "j", "k", "m", "n", "o", "p" and "q" each independently represents an integer of 0 to 500, and preferably an integer of 0 to 400.

Among these, organohydrogenpolysiloxane represented by general formula (3-1) or (3-4) is preferable, and organohydrogenpolysiloxane represented by general formula (3-1) is more preferable. In the formula (3-1), the main skeleton except the structural units (trimethylsilyl group) at both terminals thereof preferably contains 10 to 100 mol % of a structural unit represented by $MeHSiO_{2/2}$, relative to the total mole number of structural units constituting the main skeleton; and more preferably contains 20 to 100 mol % of a structural unit represented by $MeHSiO_{2/2}$.

The organopolysiloxane usable as the component (B-2) of the present invention is a compound having at least three hydrolyzable groups bonded to silicon atoms in one molecule thereof, preferably having 3 to 1,000 of hydrolyzable groups, and more preferably having 3 to 200 of hydrolyzable groups. Examples of hydrolyzable groups include alkoxy groups such as a methoxy group, an ethoxy group, a propoxy group, a butoxy group, a methoxyethoxy group, and an isopropenoxy group; and acyloxy groups such as an acetoxy group, provided that, these groups bond directly to silicon atoms. Part of these groups may have amino groups such as an ethyl amino group, an amide group, oxime groups such as an ethylmethylbutanoxime group, halogen atoms such as a chlorine atom, a bromine atom.

As the hydrolyzable group, a methoxy group, an ethoxy group, a propoxy group and a butoxy group are preferable in industrial perspective, but organopolysiloxanes represented by general formulae (5-1) to (5-4) shown below can be used.

In the formulae (5-1) to (5-4), "r" represents an integer of 1 to 200, preferably an integer of 1 to 190, and more preferably 1 to 100. "s" represents an integer of 1 to 200, and preferably an integer of 1 to 190. "n" represents an integer of 1 to 100, preferably an integer of 1 to 50, and more preferably an integer of 2 to 30. In the formulae, Me represents a methyl group, and Et represents an ethyl group. Among these, the organopolysiloxyane represented by the general formula (5-4) is preferred.

The absolute viscosity of the organopolysiloxane as a component (B-2) of the present invention, determined using a rotating viscometer at 25° C., is preferably 1 to 100 mPa·s, and more preferably 2 to 50 mPa·s.

[Chemical formula 3]

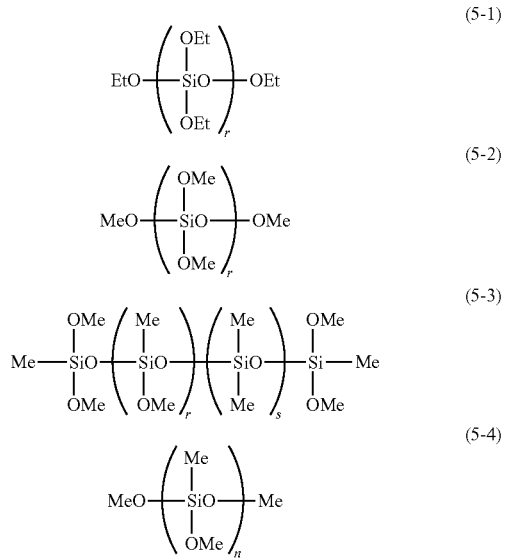

The organopolysiloxane having branched or cyclic structure may be used instead of the organopolysiloxane represented by the aforementioned general formulae.

Part of hydrogen atoms within an alkoxy group may be replaced by $CH_3COO-$, $CH_3(C_2H_5)C=NO-$, $(C_2H_5)_2N-$, $CH_3CO(C_2H_5)N-$ or $CH_2=(CH_3)CO-$.

As the component (C-1), the same component as that of component (B-2) can be mentioned. As the component (C-1), the compound represented by the aforementioned formula (5-4) is preferred.

Each of the components (A-3), (B-3) and (C-2) is a component which condenses and cures the components (A-1) and (A-2), the components (B-1) and (B-2), and the component (C-1) through dehydration, dehydrogenation and dealcoholation, and which hydrolyzes the hydrolyzable group of the components (B-2) and (C-1).

As a condensation catalyst, various metal catalysts, such as titanium compounds, zirconium compounds, aluminum compounds and tin compounds can be used. Among these, tin compounds can be preferably used. As the thin compounds, organic acid salts of tin, and polydentate ligand chelate compounds of tin can be mentioned.

As the organic salts of tin, in terms of excellent solubility, organic salts having 2 to 20 carbon atoms (e.g., salts of acetic acid, octyl acid, decanoic acid, lauric acid and stearic acid) are preferable. Among these, dicarboxylic acid salt of tin compound which has two alkyl groups bonded directly to a tin atom is more preferable. As the alkyl group, a methyl group, an ethyl group, a butyl group, an octyl group, a decyl group and a dodecyl group can be mentioned, an alkyl group having 8 to 25 carbon atoms is preferable. Specifically, an octyl group and a decyl group can be mentioned, and among these, an octyl group is preferable. As the polydentate ligand chelate compounds of tin, a compound in which a multidentate ligand such as catechol, crown ethers, polyvalent carboxylic acid, hydroxy acids, diketones, keto acid and substituted derivatives thereof is coordinated to a tin atom can be mentioned. A plurality of ligands may be coordinated to one molecule of tin. Specific examples of ligands include dicarboxylic acid, β-hydroxy acid, 1,3-diketone, β-keto acid, β-hydroxy ketone and substituted derivatives thereof. Among these, malonic acid, acetoacetic acid, acetylacetone, and substituted derivatives thereof are preferable. As the condensation catalyst, dioctyl tin diacetate, dioctyl tin dilaurate, dibutyl tin diacetate, dibutyl tin dilaurate are particularly preferable. Among these, dioctyl tin diacetate is most preferable.

As a hydrolyzable group in the components (B-2) and (C-1), alkoxy groups (e.g., a methoxy group, an ethoxy group, a propoxy group, a butoxy group, a methoxyethoxy group, and an isopropenoxy), acetoxy groups (e.g., an acyloxy group), amino groups (e.g., an ethylamino group), an amide group, oxime groups (e.g., an ethylmethylbutanoxime group) can be mentioned, provided that, these groups bond directly to a silicon atom of organopolysiloxane. Among these, in terms of cost and safety, an alkoxy group and an acetoxy group are preferable.

Specific examples of the components (B-2) and (C-1) include hydrolyzable silane monomer such as dimethyldimethoxysilane, methyltrimethoxysilane, tetramethoxysilane, diphenyldimethoxysilane, phenyltrimethoxysilane, dimethyldiethoxysilane, methyltriethoxysilane, tetraethoxysilane, diphenyldiethoxysilane, phenyltriethoxysilane, dimethyldipropoxysilane, methyltripropoxysilane, tetrapropoxysilane, diphenyldipropoxysilane, phenyltripropoxysilane, dimethyldibutoxyphenylsilane, methyltributoxysilane, tetrabutoxysilane, diphenyldibutoxysilane, phenyltributoxysilane, dimethylacyloxysilane, methyltriacyloxysilane, tetraacyloxysilane, diphenylacyloxysilane, phenyltriacyloxysilane; partial hydrolysis condensates of the hydrolysable silane monomer; and co-condensates of the hydrolyzable silane monomer.

The amount of the component (A-1) in the composition (A), relative to the total amount of the composition (A) is preferably 99 to 80% by mass, and more preferably 98 to 90% by mass.

The amount of the component (A-2) in the composition (A), relative to the total amount of the composition (A) is preferably 1 to 20% by mass, and more preferably 2 to 15% by mass.

The amount of the component (A-3) in the composition (A), relative to 100 parts by mass of the sum of the components (A-1) and (A-2) is preferably 1 to 50 parts by mass, and more preferably 2 to 30 parts by mass.

The amount of the component (B-1) in the composition (B), relative to the total amount of the composition (B) is preferably 99 to 40% by mass, and more preferably 98 to 50% by mass.

The amount of the component (B-2) in the composition (B), relative to the total amount of the composition (B) is preferably 1 to 60% by mass, and more preferably 2 to 50% by mass.

The amount of the component (B-3) in the composition (B), relative to 100 parts by mass of the sum of the components (B-1) and (B-2) is preferably 1 to 50 parts by mass, and more preferably 2 to 30 parts by mass.

The amount of the component (C-1) in the composition (C), relative to the total amount of the composition (C) is preferably 99 to 50% by mass, and more preferably 98 to 70% by mass.

The amount of the component (C-2) in the composition (C), relative to 100 parts by mass of the component (C-1) is preferably 1 to 50 parts by mass, and more preferably 2 to 30 parts by mass.

The mass ratio of (A-1)/(A-2) in the composition (A) is preferably 99/1 to 80/20, more preferably 99/1 to 85/15, provided that the sum of the components (A-1) an (A-2) is 100 parts by mass.

The mass ratio of (B-1)/(B-2) in the composition (B) is preferably 99/1 to 40/60, more preferably 98/2 to 50/50, provided that the sum of the components (B-1) an (B-2) is 100 parts by mass.

The mass ratio of (C-1)/(C-2) in the composition (C) is preferably 99/1 to 50/50, more preferably 98/2 to 70/30, provided that the sum of the components (C-1) an (C-2) is 100 parts by mass.

When the compositional profile of the compositions (A) to (C) fulfills the above identified range, the objective release properties are reliably obtained.

In the release component, the amount of the composition (A) relative to the total amount of the release component is preferably 2 to 80% by mass, and more preferably 5 to 60% by mass.

In the release component, the amount of the composition (B) relative to the total amount of the release component is preferably 2 to 80% by mass, and more preferably 5 to 60% by mass.

In the release component, the amount of the composition (C) relative to the total amount of the release component is preferably 2 to 80% by mass, and more preferably 5 to 80% by mass.

The release component of the present invention may contain other organic resin. The organic resin is a component blended for the purpose of improving stability in treating bath, improving coating properties relative to various substrates, improving film forming stability, controlling release properties, controlling viscosity and amount for coating. For example, as an organic resin, silicone, polyvinyl alcohol, poly(meth) acrylates, polyesters, cellulose, and derivatives thereof can be used, and the organic resin can be blended to the release component within the range of 2 to 400 parts by mass relative to 100 parts by mass of release component. When the organic resin adversely affects release properties and antistatic properties, the organic resin may not be blended. As the derivatives, a compound in which part of hydroxyl groups within cellulose has been subjected to etherification by an alkyl group can be mentioned. As the alkyl group, a methyl group, an ethyl group, a propyl group and a butyl group can be mentioned, and an ethyl group is preferred.

The release component of the present invention may contain an organic solvent. The organic solvent is a component blended for the purpose of improving stability in treating bath, improving coating properties relative to various substrates and controlling viscosity and amount for coating. As the organic solvent, an appropriate amount of organic solvent capable of dissolving the composition uniformly can be used. For example, toluene, xylene, ethyl acetate, butyl acetate, isobutyl acetate, acetone, methyl ethyl ketone, methyl isobutyl ketone, methanol, ethanol, IPA, butanol, diacetone alcohol, hexane, heptane, and octane can be mentioned. The amount of the organic solvent is 10 to 1,900 parts by mass relative to 100 parts by mass of the release component, but the organic solvent may not be blended depending on the coating method.

As the releasing component, the component (A), component (B) or component (C) is preferable. Among these, the component (A) or (B) is more preferable. In the composition (A), with respect to components (A-1), (A-2) and (A-3), one type may be used or two or more types may be used in combination. The composition (A) may include the component (B-2).

In the composition (B), with respect to components (B-1), (B-2) and (13-3), one type may be used or two or more types may be used in combination.

In the composition (C), with respect to components (C-1) and (C-2), one type may be used or two or more types may be used in combination. The composition (C) may include the component (A-2).

When the composition contains the component (A-2), the component (A-1) or (B-1), the component (B-2) or (C-1) and the condensation catalyst, the composition falls under the definition of the composition (A); when the composition contains the component (B-1), the component (B-2) or (C-1), and the condensation catalyst, the composition falls under the definition of the composition (B); and when the composition contains the component (A-2), the component (13-2) or (C-1) and the condensation catalyst, the composition falls under the definition of the composition (C).

(Conductive Component)

The conductive component contained in the antistatic release agent of the present invention contains a complex of a π-conjugated electrically conductive polymer and a polyanion. In the complex, a π-conjugated electrically conductive polymer is coordinated to portion of anion groups of a polyanion and doped, so as to form a complex of a π-conjugated electrically conductive polymer and a polyanion.

The conductive component, if required, may contain a conductive material or ion conductive compound other than the complex.

The amount of the conductive component relative to 100 parts by mass of the release component is 1 to 300 parts by mass, and more preferably 1 to 65 parts by mass. When the amount of the conductive component is at least as large as the lower limit, antistatic properties are sufficiently obtained. When the amount of the conductive component is no more than the upper limit, release properties are sufficiently obtained.

In the antistatic release agent of the present invention, the amount of the conductive component relative to the total amount of the antistatic release agent is preferably 1 to 75% by mass, and more preferably 1 to 40% by mass.

[π-Conjugated electrically conductive Polymer]

The π-conjugated electrically conductive polymer is an organic polymer in which the main chain is composed with a π-conjugated system, and examples thereof include polypyrroles, polythiophenes, polyacetylenes, polyphenylenes, polyphenylenevinylenes, polyanilines, polyacenes, polythiophenevinylenes and copolymers thereof. Polypyrroles, polythiophenes and polyanilines are preferable from the viewpoint of ease in polymerization and stability in air. In terms of solubility in solvent and transparency, polythiophenes are preferable. Here, "main chain" refers to the main carbon chain of a chain compound, and in the present description, refers to the trunk portion having the largest number of carbon atoms in the π-conjugated electrically conductive polymer.

Specific examples of polythophenes include polythiophenes such as polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene) or poly(3-methyl-4-carboxybutylthiophene).

Among these, polythiophene, poly(3-methylthiophene), poly (3-methoxythiophene) and poly(3,4-ethylenedioxythiophene) are preferable, and poly(3,4-ethylenedioxythiophene) is more preferable.

Examples of polypyrroles include polypyrrole, poly(N-methylpyrrole), poly(3-methylpyrrole), poly(3-ethylpyrrole), poly(3-n-propylpyrrole), poly(3-butylpyrrole), poly (3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly (3-butoxypyrrole), poly(3-hexyloxypyrrole), and poly(3-methyl-4-hexyloxypyrrole).

Among these, polypyrrole, poly(N-methylpyrrole), and poly(3-methylpyrrole) are preferable, and polypyrrole is more preferable.

Examples of polyanilines include polyaniline, poly(3-methylaniline), poly(3-isobutylaniline), poly(2-aniline sulfonic acid) and poly(3-aniline sulfonic acid).

Among these, polyaniline, poly(2-aniline sulfonic acid), and poly(3-aniline sulfonic acid) are preferable, and polyaniline is more preferable.

Among the aforementioned π-conjugated electrically conductive polymers, poly (3-methoxythiophene) and poly(3,4-ethylenedioxythiophene) are preferable, poly (3,4-ethylenedioxythiophene) are particularly preferable from the viewpoints of electrical conductivity, transparency and heat resistance.

[Polyanion]

The polyanion refers to a polymer having a structural unit having an anion group (to also be referred to as a "monomer unit") in a molecule thereof. The anion group of this polyanion functions as a dopant for the π-conjugated electrically conductive polymer, and improves the electrical conductivity of the π-conjugated electrically conductive polymer.

In one mode of the present invention, the anion groups of the polyanion is preferably a sulfo group or carboxyl group. In addition, the polyanion is preferably a polymer obtained by copolymerizing a monomer unit having the aforementioned sulfo group or carboxyl group.

Specific examples of the polyanion include polystyrene sulfonate, polyvinylsulfonate, polyallylsulfonate, polyacrylsulfonate, polymethacrylsulfonate, poly(2-acrylamido-2-methylpropanesulfonate), polyisoprene sulfonate, polysulfoethyl methacrylate, poly(4-sulfobutylmethacrylate), polymethacryloxybenzene sulfonate, polyvinyl carboxylate, polystyrene carboxylate, polyallylcarboxylate, polyacrylcarboxylate, polymethacrylcarboxylate, poly(2-acrylamide-2-methylpropanecarboxylate), polyisoprene carboxylate and polyacrylic acid. These may be homopolymers or copolymers of two or more types thereof. Polymers having a sulfonate group are most preferable.

Among these, poly(2-acrylamido-2-methylpropane sulfonic acid), polyisoprene sulfonate, polystyrene sulfonate and polyvinyl sulfonate are preferred, and polystyrene sulfonate is particularly preferable.

The degree of polymerization of the polyanion is preferably such that the number of monomer units is within the range of 10 to 100,000, and more preferably within the range of 50 to 10,000, from the viewpoints of dispersibility and electrical conductivity.

The mass average molecular mass of the polyanion is preferably 20,000 to 1,000,000. If the mass average molecular mass of the polyanion is equal to or greater than the aforementioned lower limit, an antistatic release agent containing a π-conjugated electrically conductive polymer can be made into a uniform release agent, while if the mass average molecular mass is equal to or less than the aforementioned upper limit, sufficiently high electrical conductivity can be obtained.

In the present invention, with respect to polyanion, high compatibility with organopolysiloxane is required, and the degree of polymerization or the molecular mass of the polyanion needs to be adjusted depending on the compatibility. However, inherent stability and conductivity shall not be impaired thereby. In view of these, the range of the mass average molecular mass of the polyanion is more preferably 20,000 to 750,000.

The amount of the polyanion is preferably within the range of 0.1 moles to 10 moles, and more preferably within the range of 1 mole to 7 moles, based on 1 mole of the π-conjugated electrically conductive polymer. If the content of the polyanion is less than the aforementioned lower limit value, the doping effect on the π-conjugated electrically conductive polymer tends to weaken, thereby resulting in a shortage of electrical conductivity. Moreover, since dispersibility and solubility become low, it becomes difficult to obtain a uniform aqueous solution. In addition, if the content of the polyanion exceeds the aforementioned upper limit value, the content of the π-conjugated electrically conductive polymer decreases, thereby making it difficult to obtain adequate electrical conductivity.

Not all anion groups in the polyanion dope the π-conjugated electrically conductive polymer, and surplus anion groups are present. Since these surplus anion groups are hydrophilic groups, they fulfill the role of improving water dispersibility of the aforementioned complex.

In the all anion groups of the polyanion, the amount of surplus anion groups relative to the total anion groups in the polyanion is preferably 30 to 90 mol %, and more preferably 45 to 75 mol %.

Among these, it is preferable that poly(3,4-ethylenedioxythiophene) as a π-conjugated electrically conductive polymer is coordinated to part of the anion groups of polystyrene sulfonate as a polyanion and doped, so as to form a complex of a π-conjugated electrically conductive polymer and a polyanion.

The amount of polystyrene sulfonate relative to 1 mole of poly(3,4-ethylenedioxythiophene) is preferably 1 to 10 mol, and more preferably 1.5 to 5 mol.

Among these, it is preferable that poly(3,4-ethylenedioxythiophene) as a π-conjugated electrically conductive polymer is coordinated to part of anion groups of polystyrene sulfonate as a polyanion and doped, to form a complex of a π-conjugated electrically conductive polymer and a polyanion.

In this invention, part of anion groups of the polyanion, specifically, a surplus anion group, which does not dope the π-conjugated electrically conductive polymer, is coordinated to or bonded to at least one amine compound selected from the group consisting of a secondary amines, a tertiary amines and a quaternary ammonium salt as an ion pair.

When a surplus anion group is coordinated to or bonded to at least one amine compound, the hydrophilicity is decreased and the hydrophobicity is increased, and hence, dispersibility of the complex in organic solvent and compatibility with an organopolysiloxane are improved.

The amine compound which is coordinated to or bonded to a surplus anion group has at least one substituent selected from the group consisting of an alkyl group having 4 or more carbon atoms, an aryl group, an aralkyl group, an alkylene group, an arylene group, an aralkylene group and an oxyalkylene group. When the amine compound which is coordinated to or bonded to a surplus anion group has the substituent, hydrophobicity can be further enhanced.

The term "substituent" refers to an organic group that bonds to the nitrogen atom of the amine compound.

The substituent preferably has 4 to 12 carbon atoms, more preferably 4 to 8 carbon atoms.

As the alkyl group having 4 or more carbon atoms, a butyl group, a pentyl group, a hexyl group, a heptyl group, an octyl group, an undecyl group and a dodecyl group can be mentioned.

As the aryl group, a phenyl group, a tolyl group, a xylyl group, and a naphthyl group can be mentioned.

As the aralkyl group, a benzyl group, and a phenethyl group can be mentioned.

As the alkylene group, an ethylene group, a propylene group and a butylene group can be mentioned.

As the arylene group, a phenylene group and a naphthylene group can be mentioned.

As the aralkylene group, a benzylene group and a phenethylene group can be mentioned.

As the oxyalkylene group, an ethyleneoxide group, a propyleneoxide group and a tetraethyleneoxide group can be mentioned.

As the secondary amine having a substituent, methyloctylamine, methylbenzyl amine, N-methyl aniline, dibutyl amine, di-2-ethylhexylamine, dioctylamine, diundecylamine, didodecylamine and diheptylamine can be mentioned.

As the tertiary amine having a substituent, tributylamine, tripentylamine, trihexylamine, triheptylamine, trioctylamine, tridecylamine, triundecylamine, tridodecylamine, triphenylamine, tribenzylamine, triperfluoropropylamine, triperfluorobutylamine, tri-2-ethylhexylamine, didecylmethylamine, dimethyloctadecylamine, didodecylamine and N,N-dibenzylaniline can be mentioned.

As the quaternary ammonium salt having a substituent, methyltrihexylammonium chloride, methyltrioctylammonium chloride, methyltridecylammonium chloride, methyltridodecylammonium chloride, dioctyldimethylammonium bromide, Didecyldimethylammonium bromide, di-dodecyl dimethyl ammonium bromide, tetrahexylammonium bromide, tetraoctylammonium bromide, tetradecylammonium bromide, tetra-dodecylammonium bromide, 1-dodecyl-2-methyl-3-benzylimidazolium chloride, 1-tetradecyl-2-methyl-3-benzylimidazolium chloride, 1-hexadecyl-2-methyl-3-benzylimidazolium chloride, 1-octadecyl-2-methyl-3-benzyl-imidazolium chloride, 1-hexyl-3-methylimidazolium chloride, 1-octyl-3-methylimidazolium chloride, methylpyridinium chloride, ethylpyridinium chloride, propylpyridinium chloride, butylpyridinium chloride, hexylpyridinium chloride, octylpyridinium chloride, decylpyridinium chloride, dodecylpyridinium chloride and hexadodecylpyridinium chloride can be mentioned.

As the aminealkylene oxide having a substituent, compounds represented by chemical formulae I and II shown below.

In the formulae, $R^1$, $R^2$ and $R^3$ each independently represents an alkyl group of 1 to 24 carbon atoms; $A^1O$, $A^2O$ and $A^3O$ each independently represents an oxyalkylene group having 2 to 4 carbon atoms or a mixture thereof; and p, q and r each independently represents $1 \leq p \leq 100$, $1 \leq q \leq 100$ and $1 \leq r \leq 100$, provided that, $2 < q + r \leq 100$.

Here, it is necessary that the total number of carbon atoms of $R^1$, $R^2$ and $R^3$ and $A^1 \times p$, $A^2 \times q$, and $A^3 \times r$ in $(A^1O)_p$, $(A^2O)_q$ and $(A^3O)_r$, that is, the number of carbon atoms of the compound represented by chemical formula I or II is within the range of 4 to 448.

It is preferable that $R^1$, $R^2$ and $R^3$ are alkyl groups having 4 to 12 carbon atoms, or alkyl groups having 7 to 10 carbon atoms.

It is preferable that $A^1O$, $A^2O$ and $A^3O$ are oxyalkylene group having 4 to 12 carbon atoms or mixtures thereof.

It is preferable that p, q and r each independently represents $1 \leq p \leq 25$, $1 \leq q \leq 25$, and $1 \leq r \leq 25$, provided that $2 \leq q + r \leq 25$, and it is more preferable that $15 \leq q + r \leq 25$.

Specifically, compounds can be selected from each of the product series of Ionet (trade name, Sanyo Chemical Industries, Ltd.), Nymeen (trade name, NOF Corp.), or Ethomeen (trade name, Lion Akzo Co., Ltd.) and the like.

More specifically the trade name "Ionet" is a compound corresponding to the chemical formula I.

The trade name "Nymeen" is a compound corresponding to the chemical formula II.

The trade name "Ethomeen" is a compound corresponding to the chemical formula II.

[Chemical Formula 4]

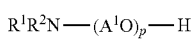
Chemical formula I

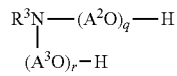
Chemical formula II

As the amine compound, trihexylamine, trioctylamine, tridodecylamine and aminealkylene oxide (particularly, Ethomeen C/25 and Ethomeen C/15 which meet $15 \leq q+r \leq 25$) are preferable, and at least one amine compound selected from the group consisting of trioctylamine, a compound represented by the chemical formula I and a compound represented by the chemical formula II is more preferable.

The amount of amine compound relative to the polyanion is preferably 0.1 to 10 molar equivalents, more preferably 0.5 to 2.0 molar equivalents, and still more preferably 0.85 to 1.25 molar equivalents. The term "molar equivalent" refers to the ratio of mole number. Specifically, when the mole number of surplus anion groups in a polyanion is 1 mole, the molar equivalent means the mole number of the amine compound which is coordinated to or bonded to the surplus anion group. In the present specification, the expression "amine compound which is coordinated to or bonded to part of the anion groups of polyanion as an ion pair" means that, with respect to the total amount of anion groups in polyanion, the amine compound is coordinated or bonded to 30 to 90 mol % of anion groups as an ion pair. Further, it is preferable that the amine compound is coordinated to or bonded to 45 to 90 mol % of anion groups as an ion pair. The term "bond" includes covalent bonds, hydrogen bonds, and ionic bonds.

(Organic Solvent)

As the organic solvent in the antistatic release agent of the present invention, solvents (e.g., toluene, xylene, acetic acid ester) which dissolve the release component may be used, or solvents (e.g., ketone solvents such as methyl ethyl ketone, alcohol solvents such as isopropyl alcohol, diacetone alcohol) which dissolve the conductive component may be used and these solvents may be used in combination. However, in the case where the release component contains the composition (A) (or when the release component contains the composition (C) which includes the component (A-2)), when alcohol solvent is used, since the dehydrogenation reaction occurs between the hydrosilyl group and a hydroxyl group as a side reaction, it is necessary to pay attention to the amount of the alcohol solvent to be used. In the case where the release component contains composition (B) or (C) (provided that the component (A-2) is not included), when the alcohol solvent is used, storage stability of the antistatic release agent can be improved. Therefore, the organic solvent may be appropriately selected depending on the materials contained in the antistatic release agent.

Among these, as the organic solvent, at least one organic solvent selected from the group consisting of toluene, methanol, ethanol, isopropanol, butanol, diacetone alcohol, and methyl ethyl ketone can be preferably used. As a mixed solvent, it is preferable that 10 to 99 parts by mass of solvent capable of dissolving a conductive polymer and 1 to 90 parts by mass of solvent capable of dissolving a release component are used in combination. It is more preferable that at least one organic solvent selected from the group consisting of toluene, butanol, isopropanol, methyl ethyl ketone and diacetone alcohol.

The amount of organic solvent is appropriately adjusted depending on a predetermined thickness of release agent layer and the composition of each component. In general, when the total amount of the release component and conductive component is 1 (parts by mass), the amount of organic solvent is 0.1 to 100 parts by mass.

When the composition contains the component (A-2), and alcohol solvent is used as organic solvent, it is preferable that the amount of alcohol solvent is 10 to 99 parts by mass relative to 1 part by mass of the total amount of the release component and conductive component.

(Conductivity Improvers)

In the antistatic release film of the present invention may include a conductive improver as a second dopant.

As a conductive improver, glycidyl compounds, polar solvents, polyhydric aliphatic alcohols, nitrogen-containing aromatic cyclic compounds, compounds having two or more hydroxyl groups, compounds having two or more carboxyl groups, compounds having one or more hydroxyl group and one or more carboxyl group, and lactam compound can be mentioned.

Among these, conductive improver which is less likely to inhibit curing of the release component is preferable. When a conductive improver which is less likely to inhibit curing of the release component is used, after an adhesive layer composed of adhesive sheet is stacked on a release agent layer formed from antistatic release agent, transference of the release agent onto the adhesive layer can be suppressed.

As a conductive improver which is less likely to inhibit curing of the release component, glycidyl compounds, polar solvents and polyhydric aliphatic alcohols can be mentioned.

The conductive improver is preferably in a liquid state at 25° C. When a conductive improver is in a liquid state, the transparency of the release agent layer formed from the antistatic release agent can be improved, and the transference of foreign material into an adhesive layer to be laminated on the release agent layer can be suppressed. In the case where the temperature of a conductive improver is adjusted at 25° C., when the conductive improver becomes liquid, the conductive improver falls under the definition of the conductive polymer which is in a liquid state at 25° C. The term "liquid state" refers to liquid.

Specific examples of glycidyl compounds include ethyl glycidyl ether, n-butyl glycidyl ether, t-butyl glycidyl ether, allyl glycidyl ether, benzyl glycidyl ether, glycidyl phenyl ether, bisphenol A diglycidyl ether, acrylic acid glycidyl ether and methacrylic acid glycidyl ether.

Specific examples of polar solvents include N-methylformamide, N-methyl acrylamide, N-methylmethacryl amide, N-ethyl acrylamide, N-ethylmethacrylamide, N, N-dimethylacrylamide, N, N-dimethyl methacrylamide, N, N-diethyl acrylamide, N, N-diethyl methacrylamide, 2-hydroxyethyl acrylamide, 2-hydroxyethyl methacrylamide, N-methylol acrylamide, N-methylol methacrylamide, N-methyl-2-pyrrolidone, N-methylacetamide, N, N-dimethylformamide, N, N-dimethylacetamide, dimethyl sulfoxide, hexamethylene phosphortriamide, N-vinylpyrrolidone, N-vinyl formamide, N-vinyl acetamide, methyl lactate, ethyl lactate and propyl lactate.

As polyhydric aliphatic alcohols, ethylene glycol, diethylene glycol, propylene glycol, 1,3-butylene glycol, 1,4-butylene glycol, glycerol, diglycerol, isoprene glycol, butanediol, 1,5-pentanediol, 1,6-hexanediol, 1,9-nonanediol, neopentyl glycol, trimethylol ethane, trimethylol propane, thiodiethanol and dipropylene glycol can be mentioned.

As the conductive improver, dimethyl sulfoxide, ethylene glycol, 2-hydroxyethyl acrylamide, or ethyl lactate is preferably used.

The amount of the conductive improver relative to 100 parts by mass of conductive component is preferably 10 to 10,000, more preferably 30 to 5,000. When the amount of the conductive improver is at least as large as the lower limit, antistatic properties can be further increased. However, when the amount of the conductive improver is greater than the upper limit, release properties is likely to be deteriorated.

(Function and Effect)

Previously, a complex in which a polyanion has doped with a π-conjugated electrically conductive polymer has low compatibility with a condensation-curing type organopolysiloxane which constitutes a release component. Therefore, when the complex in which a polyanion has doped with a π-conjugated electrically conductive polymer and the condensation-curing type organopolysiloxane are mixed, uniform dispersion cannot be obtained, and hence, it is difficult to exert antistatic properties and release properties satisfactorily.

In the present invention, since amine compound having a specific substituent is coordinated to or bonded to a surplus anion group of a polyanion, and hence, the hydrophobicity of the complex is increased. Therefore, since the compatibility between the condensation-curing type organopolysiloxane and a complex in which a polyanion has doped a π-conjugated electrically conductive polymer is enhanced, uniform dispersion can be obtained. As a result, both antistatic properties and release properties can be exerted.

In the present invention, "compatibility" is not limited to the degree of compatibility in a microscopic molecular level, and includes the degree of compatibility in macro level. When a high level of compatibility is obtained, even though the mixture is separated by a microscopic observation (for example, using an electron microscope), but the mixture is compatible each other by a macro observation (for example, visually observation).

The antistatic release agent of the present invention is non-aqueous type, and therefore it has a high adhesive property relative to a plastic film. The antistatic release agent of the present invention also has a high adhesive property relative to paper.

Furthermore, the antistatic release agent of the present invention has a high transparency.

The antistatic release agent according to the first aspect of the present invention preferably includes: a release component which is a silicone material containing at least one composition selected from the group consisting of the compositions (A) to (C) shown below; a conductive component containing a complex of poly(3,4-ethylenedioxythiophene) and polystyrene sulfonate; and at least one organic solvent selected from the group consisting of toluene, methanol, ethanol, isopropanol, butanol, diacetone alcohol and methyl ethyl ketone; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(A): a composition (A) that includes components (A-1) to (A-3) shown below

Component (A-1): organopolysiloxane having at least two hydroxyl groups within one molecule thereof Component (A-2): organopolysiloxane having at least three SiH groups within one molecule thereof Component (A-3): at least one condensation catalyst selected from the group consisting of dioctyl tin diacetate, dioctyl tin dilaurate, dibutyl tin diacetate and dibutyl tin dilaurate (B): a composition (B) that includes components (B-1) to (B-3) shown below Component (B-1): organopolysiloxane having at least two hydroxyl groups within one molecule thereof Component (B-2): organopolysiloxane having at least three hydrolyzable groups within one molecule thereof Component (B-3): at least one condensation catalyst selected from the group consisting of dioctyl tin diacetate, dioctyl tin dilaurate, dibutyl tin diacetate and dibutyl tin dilaurate (C): a composition (C) that includes components (C-1) and (C-2) shown below Component (C-1): organopolysiloxane having at least three hydrolyzable groups within one molecule thereof Component (C-2): at least one condensation catalyst selected from the group consisting of dioctyl tin diacetate, dioctyl tin dilaurate, dibutyl tin diacetate and dibutyl tin dilaurate The antistatic release agent according to the first aspect of the present invention preferably includes: a release component which is a silicone material containing at least one composition selected from the group consisting of the compositions (A) to (C) shown below; a conductive component containing a complex of poly(3,4-ethylenedioxythiophene) and polystyrene sulfonate; and at least one organic solvent selected from the group consisting of toluene, methanol, ethanol, isopropanol, butanol, diacetone alcohol and methyl ethyl ketone; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(A): a composition (A) that includes components (A-1) to (A-3) shown below

Component (A-1): organopolysiloxane which has at least two hydroxyl groups within one molecule thereof, and is represented by any one of the aforementioned formulae (1-1) to (1-3)

Component (A-2): organopolysiloxane which has at least three SiH groups within one molecule thereof and is represented by any one of the aforementioned formulae (3-1) to (3-5)

Component (A-3): at least one condensation catalyst selected from the group consisting of dioctyl tin diacetate, dioctyl tin dilaurate, dibutyl tin diacetate and dibutyl tin dilaurate (B): a composition (B) that includes components (B-1) to (B-3) shown below Component (B-1): organopolysiloxane which has at least two hydroxyl groups within one molecule thereof and is represented by any one of the aforementioned formulae (1-1) to (1-3)

Component (B-2): organopolysiloxane which has at least three hydrolyzable groups within one molecule thereof and is represented by any one of the aforementioned formulae (5-1) to (5-4)

Component (B-3): at least one condensation catalyst selected from the group consisting of dioctyl tin diacetate, dioctyl tin dilaurate, dibutyl tin diacetate and dibutyl tin dilaurate (C): a composition (C) that includes components (C-1) and (C-2) shown below Component (C-1): organopolysiloxane which has at least three hydrolyzable groups within one molecule thereof and is represented by any one of the aforementioned formulae (5-1) to (5-4)

Component (C-2): at least one condensation catalyst selected from the group consisting of dioctyl tin diacetate, dioctyl tin dilaurate, dibutyl tin diacetate and dibutyl tin dilaurate The antistatic release agent according to the first aspect of the present invention preferably includes: a release component which is a silicone material containing a composition (A) shown below; a conductive component containing a complex of poly(3,4-ethylenedioxythiophene) and polystyrene sulfonate; and at least one organic solvent selected from the group consisting of toluene, methanol, ethanol, isopropanol, butanol, diacetone alcohol and methyl ethyl ketone; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(A): a composition (A) that includes components (A-1) to (A-3) shown below

Component (A-1): organopolysiloxane which has at least two hydroxyl groups within one molecule thereof and is represented by any one of the aforementioned formulae (1-1) to (1-3)

Component (A-2): organopolysiloxane which has at least three SiH groups within one molecule thereof and is represented by any one of the aforementioned formulae (3-1) to (3-5)

Component (A-3): at least one condensation catalyst selected from the group consisting of dioctyl tin diacetate, dioctyl tin dilaurate, dibutyl tin diacetate and dibutyl tin dilaurate The antistatic release agent according to the first aspect of the present invention preferably includes: a release component which is a silicone material containing a composition (B) shown below; a conductive component containing a complex of poly(3,4-ethylenedioxythiophene) and polystyrene sulfonate; and at least one organic solvent selected from the group consisting of toluene, methanol, ethanol, isopropanol, butanol, diacetone alcohol and methyl ethyl ketone; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(B): a composition (B) that includes components (B-1) to (B-3) shown below

Component (B-1): organopolysiloxane which has at least two hydroxyl groups within one molecule thereof and is represented by any one of the aforementioned formulae (1-1) to (1-3)

Component (B-2): organopolysiloxane which has at least three hydrolyzable groups within one molecule thereof and is represented by any one of the aforementioned formulae (5-1) to (5-4)

Component (B-3): at least one condensation catalyst selected from the group consisting of dioctyl tin diacetate, dioctyl tin dilaurate, dibutyl tin diacetate and dibutyl tin dilaurate The antistatic release agent according to the first aspect of the present invention preferably includes: a release component which is a silicone material containing a composition (C) shown below; a conductive component containing a complex of poly(3,4-ethylenedioxythiophene) and polystyrene sulfonate; and at least one organic solvent selected from the group consisting of toluene, methanol, ethanol, isopropanol, butanol, diacetone alcohol and methyl ethyl ketone; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(C): a composition (C) that includes components (C-1) and (C-2) shown below

Component (C-1): organopolysiloxane which has at least three hydrolyzable groups within one molecule thereof and is represented by any one of the aforementioned formulae (5-1) to (5-4)

Component (C-2): at least one condensation catalyst selected from the group consisting of dioctyl tin diacetate, dioctyl tin dilaurate, dibutyl tin diacetate and dibutyl tin dilaurate The antistatic release agent according to the first aspect of the present invention preferably includes: a release component which is a silicone material containing a composition (A) shown below; a conductive component containing a complex of poly(3,4-ethylenedioxythiophene) and polystyrene sulfonate; at least one organic solvent selected from the group consisting of toluene, methanol, ethanol, isopropanol, butanol, diacetone alcohol and methyl ethyl ketone; and at least one conductive improver selected from the group consisting of dimethyl sulfoxide, ethylene glycol, 2-hydroxyethyl acrylamide and ethyl lactate; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(A): a composition (A) that includes components (A-1) to (A-3) shown below

Component (A-1): organopolysiloxane which has at least two hydroxyl groups within one molecule thereof and is represented by any one of the aforementioned formulae (1-1) to (1-3)

Component (A-2): organopolysiloxane which has at least three SiH groups within one molecule thereof, and is represented by any one of the aforementioned formulae (3-1) to (3-5)

Component (A-3): at least one condensation catalyst selected from the group consisting of dioctyl tin diacetate, dioctyl tin dilaurate, dibutyl tin diacetate and dibutyl tin dilaurate The antistatic release agent according to the first aspect of the present invention preferably includes: a release component which is a silicone material containing a composition (B) shown below; a conductive component containing a complex of poly(3,4-ethylenedioxythiophene) and polystyrene sulfonate; at least one organic solvent selected from the group consisting of toluene, methanol, ethanol, isopropanol, butanol, diacetone alcohol and methyl ethyl ketone; and at least one conductive improver selected from the group consisting of dimethyl sulfoxide, ethylene glycol, 2-hydroxyethyl acrylamide and ethyl lactate; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(B): a composition (B) that includes components (B-1) to (B-3) shown below

Component (B-1): organopolysiloxane which has at least two hydroxyl groups within one molecule thereof and is represented by any one of the aforementioned formulae (1-1) to (1-3)

Component (B-2): organopolysiloxane which has at least three hydrolyzable groups within one molecule thereof and is represented by any one of the aforementioned formulae (5-1) to (5-4)

Component (B-3): at least one condensation catalyst selected from the group consisting of dioctyl tin diacetate, dioctyl tin dilaurate, dibutyl tin diacetate and dibutyl tin dilaurate The antistatic release agent according to the first aspect of the present invention preferably includes: a release component which is a silicone material containing a composition (C) shown below; a conductive component containing a complex of poly(3,4-ethylenedioxythiophene) and polystyrene sulfonate; at least one organic solvent selected from the group consisting of toluene, methanol, ethanol, isopropanol, butanol, diacetone alcohol and methyl ethyl ketone; and at least one conductive improver selected from the group consisting of dimethyl sulfoxide, ethylene glycol, 2-hydroxyethyl acrylamide and ethyl lactate; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(C): a composition (C) that includes components (C-1) and (C-2) shown below

Component (C-1): organopolysiloxane which has at least three hydrolyzable groups within one molecule thereof and is represented by any one of the aforementioned formulae (5-1) to (5-4)

Component (C-2): at least one condensation catalyst selected from the group consisting of dioctyl tin diacetate, dioctyl tin dilaurate, dibutyl tin diacetate and dibutyl tin dilaurate The antistatic release agent according to the first aspect of the present invention preferably includes: a release component which is a silicone material containing at least one composition selected from the group consisting of the compositions (A) to (C) shown below; a conductive component containing a complex of poly(3,4-ethylenedioxythiophene) and polystyrene sulfonate; and at least one organic solvent selected from the group consisting of toluene, methanol, ethanol, isopropanol, butanol, diacetone alcohol and methyl ethyl ketone; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(A): a composition (A) that includes components (A-1) to (A-3) shown below

Component (A-1): organopolysiloxane which has at least two hydroxyl groups within one molecule thereof, has 50 to 100,000 mPa·s of a viscosity of 30% by mass toluene solution, determined using a rotating viscometer at 25° C., and has dimethylhydroxysiliy groups at the both terminal of main chain of the molecular chain and has a main skeleton containing 90 to 100 mol % of dimethylsiloxane unit and 0 to 10 mol % of diphenylsiloxane unit.

Component (A-2): organopolysiloxane which has at least three SiH groups within one molecule thereof, has trimethylsilyl groups at the both terminal of main chain of molecular chain, has a main skeleton containing 10 to 100 mol % of MeHSiO$_{2/2}$ unit relative to the total mole number of the structural units constituting the main skeleton, and has 2 to 1,000 mPa·s of an absolute viscosity determined using a rotating viscometer at 25° C.

Component (A-3): dioctyl tin diacetate (B): a composition (B) that includes components (B-1) to (B-3) shown below Component (B-1): organopolysiloxane which has at least two hydroxyl groups within one molecule thereof, has 50 to 100,000 mPa·s of a viscosity of 30% by mass toluene solution, determined using a rotating viscometer at 25° C., and has dimethylhydroxysiliy groups at the both terminal of main chain of the molecular chain, and has a main skeleton containing 90 to 100 mol % of dimethylsiloxane unit and 0 to 10 mol % of diphenylsiloxane unit.

Component (B-2): organopolysiloxane which has at least three hydrolyzable groups within one molecule thereof, and is a partial hydrolysis condensate of MeSi(OMe)$_3$, and has 1 to 100 mPa·s of an absolute viscosity determined using a rotating viscometer at 25° C.

Component (B-3): dioctyl tin diacetate (C): a composition (C) that includes components (C-1) and (C-2) shown below Component (C-1): organopolysiloxane which has at least three hydrolyzable groups within one molecule thereof, and is represented by the aforementioned chemical formula III Component (C-2): dioctyl tin diacetate The antistatic release agent according to the first aspect of the present invention preferably includes: a release component which is a silicone material containing at least one composition selected from the group consisting of the compositions (A) to (C) shown below; a conductive component containing a complex of poly(3,4-ethylenedioxythiophene) and polystyrene sulfonate; and at least one organic solvent selected from the group consisting of toluene, methanol, ethanol, isopropanol, butanol, diacetone alcohol and methyl ethyl ketone; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(A): a composition (A) that includes components (A-1) to (A-3) shown below

Component (A-1): organopolysiloxane which has at least two hydroxyl groups within one molecule thereof, has 15,000 mPa·s of a viscosity of 30% by mass toluene solution, determined using a rotating viscometer at 25° C., and has dimethylhydroxysiliy groups at the both terminal of main chain of the molecular chain, and has a main skeleton composed of 100 mol % of dimethylsiloxane unit Component (A-2): organopolysiloxane which has at least three SiH groups within one molecule thereof, has trimethylsilyl groups at the both terminal of main chain of molecular chain, has a main skeleton composed of 100 mol % of MeHSiO$_{2/2}$ unit relative to the total mole number of the structural units constituting the main skeleton, and has 25 mPa·s of an absolute viscosity determined using a rotating viscometer at 25° C.

Component (A-3): dioctyl tin diacetate (B): a composition (B) that includes components (B-1) to (B-3) shown below Component (B-1): organopolysiloxane which has at least two hydroxyl groups within one molecule thereof, has 800 mPa·s of a viscosity of 30% by mass toluene solution, determined using a rotating viscometer at 25° C., has dimethylhydroxysiliy groups at the both terminal of main chain of the molecular chain, has a main skeleton containing 90 mol % of dimethylsiloxane unit and 10 mol % of diphenylsiloxane unit or organopolysiloxane which has at least two hydroxyl groups within one molecule thereof, has 15,000 mPa·s of a viscosity of 30% by mass toluene solution determined using a rotating viscometer at 25° C., has dimethylhydroxysiliy groups at the both terminal of main chain of the molecular chain, and has a main skeleton composed of 100 mol % of dimethylsiloxane unit Component (B-2): organopolysiloxane which has at least three hydrolyzable groups within one molecule thereof, and is a partial hydrolysis condensate of $MeSi(OMe)_3$, and has 10 mPa·s of an absolute viscosity determined using a rotating viscometer at 25° C.

Component (B-3): dioctyl tin diacetate (C): a composition (C) that includes components (C-1) and (C-2) shown below Component (C-1): organopolysiloxane which has at least three hydrolyzable groups within one molecule thereof and is represented by the aforementioned chemical formula III Component (C-2): dioctyl tin diacetate The antistatic release agent according to the first aspect of the present invention preferably includes: a release component which is a silicone material containing at least one composition selected from the group consisting of the compositions (A) to (C) shown below; a conductive component containing a complex of poly(3,4-ethylenedioxythiophene) and polystyrene sulfonate; at least one organic solvent selected from the group consisting of toluene, methanol, ethanol, isopropanol, butanol, diacetone alcohol and methyl ethyl ketone; and at least one conductive improver selected from the group consisting of dimethyl sulfoxide, ethylene glycol, 2-hydroxyethyl acrylamide and ethyl lactate; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(A): a composition (A) that includes components (A-1) to (A-3) shown below

Component (A-1): organopolysiloxane which has at least two hydroxyl groups within one molecule thereof, has 15,000 mPa·s of a viscosity of 30% by mass toluene solution, determined using a rotating viscometer at 25° C., has dimethylhydroxysiliy groups at the both terminal of main chain of the molecular chain, and has a main skeleton composed of 100 mol % of dimethylsiloxane unit Component (A-2): organopolysiloxane which has at least three SiH groups within one molecule thereof, has trimethylsilyl groups at the both terminal of main chain of molecular chain, has a main skeleton composed of 100 mol % of $MeHSiO_{2/2}$ unit relative to the total mole number of the structural units constituting the main skeleton, and has 25 mPa·s of an absolute viscosity determined using a rotating viscometer at 25° C.

Component (A-3): dioctyl tin diacetate (B): a composition (B) includes components (B-1) to (B-3) shown below.

Component (B-1): organopolysiloxane which has at least two hydroxyl groups within one molecule thereof, has 800 mPa·s of a viscosity, determined using a rotating viscometer at 25° C., has dimethylhydroxysiliy groups at the both terminal of main chain of the molecular chain, and has a main skeleton containing 90 mol % of dimethylsiloxane unit and 10 mol % of diphenylsiloxane unit or organopolysiloxane which has at least two hydroxyl groups within one molecule thereof, has 15,000 mPa·s of a viscosity of 30% by mass toluene solution determined using a rotating viscometer at 25° C., has dimethylhydroxysiliy groups at the both terminal of main chain of the molecular chain, and has a main skeleton composed of 100 mol % of dimethylsiloxane unit Component (B-2): organopolysiloxane which has at least three hydrolyzable groups within one molecule thereof and is a partial hydrolysis condensate of $MeSi(OMe)_3$, and has 10 mPa·s of an absolute viscosity determined using a rotating viscometer at 25° C.

Component (B-3): dioctyl tin diacetate (C): a composition (C) that includes components (C-1) and (C-2) shown below Component (C-1): organopolysiloxane which has at least three hydrolyzable groups within one molecule thereof and is represented by the aforementioned chemical formula III Component (C-2): dioctyl tin diacetate The antistatic release agent according to the first aspect of the present invention preferably includes: a release component which is a silicone material containing a composition (A) shown below; a conductive component containing a complex of poly(3,4-ethylenedioxythiophene) and polystyrene sulfonate; and at least one organic solvent selected from the group consisting of toluene, methanol, ethanol, isopropanol, butanol, diacetone alcohol and methyl ethyl ketone; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(A): a composition (A) that includes components (A-1) to (A-3) shown below

Component (A-1): organopolysiloxane which has at least two hydroxyl groups within one molecule thereof, has 15,000 mPa·s of a viscosity of 30% by mass toluene solution, determined using a rotating viscometer at 25° C., has dimethylhydroxysiliy groups at the both terminal of main chain of the molecular chain, and has a main skeleton composed of 100 mol % of dimethylsiloxane unit Component (A-2): organopolysiloxane which has at least three SiH groups within one molecule thereof, has trimethylsilyl groups at the both terminal of main chain of molecular chain, has a main skeleton composed of 100 mol % of $MeHSiO_{2/2}$ unit, and has 25 mPa·s of an absolute viscosity determined using a rotating viscometer at 25° C.

Component (A-3): dioctyl tin diacetate

The antistatic release agent according to the first aspect of the present invention preferably includes: a release component which is a silicone material containing a composition (B) shown below; a conductive component containing a complex of poly(3,4-ethylenedioxythiophene) and polystyrene sulfonate; and at least one organic solvent selected from the group consisting of toluene, methanol, ethanol, isopropanol, butanol, diacetone alcohol and methyl ethyl ketone; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(B): a composition (B) that includes components (B-1) to (13-3) shown below

Component (B-1): organopolysiloxane which has at least two hydroxyl groups within one molecule thereof, has 800 mPa·s of a viscosity of 30% by mass toluene solution determined using a rotating viscometer at 25° C., and has dimethylhydroxysiliy groups at the both terminal of main chain of the molecular chain, has a main skeleton containing 90 mol % of dimethylsiloxane unit and 10 mol % of diphenylsiloxane unit or organopolysiloxane which has at least two hydroxyl group within one molecule thereof, has 15,000 mPa·s of a viscosity, determined using a rotating viscometer at 25° C., and has dimethylhydroxysiliy groups at the both terminal of main chain of the molecular chain, and has a main skeleton composed of 100 mol % of dimethylsiloxane unit Component (B-2): organopolysiloxane which has at least three hydrolyzable groups within one molecule thereof and is a partial hydrolysis condensate of MeSi(OMe)$_3$, and has 10 mPa·s of an absolute viscosity determined using a rotating viscometer at 25° C.

Component (B-3): dioctyl tin diacetate

The antistatic release agent according to the first aspect of the present invention preferably includes: a release component which is a silicone material containing a composition (B) shown below; a conductive component containing a complex of poly(3,4-ethylenedioxythiophene) and polystyrene sulfonate; at least one organic solvent selected from the group consisting of toluene, methanol, ethanol, isopropanol, butanol, diacetone alcohol and methyl ethyl ketone; and at least one conductive improver selected from the group consisting of dimethyl sulfoxide, ethylene glycol, 2-hydroxyethyl acrylamide and ethyl lactate; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(B): a composition (B) includes components (B-1) to (B-3) shown below

Component (B-1): organopolysiloxane which has at least two hydroxyl groups within one molecule thereof, has 800 mPa·s of a viscosity of 30% by mass toluene solution, determined using a rotating viscometer at 25° C., has dimethylhydroxysiliy groups at the both terminal of main chain of the molecular chain, has a main skeleton containing 90 mol % of dimethylsiloxane unit and 10 mol % of diphenylsiloxane unit or organopolysiloxane which has at least two hydroxyl groups within one molecule thereof, has 15,000 mPa·s of a viscosity, determined using a rotating viscometer at 25° C., has dimethylhydroxysiliy groups at the both terminal of main chain of the molecular chain, and has a main skeleton composed of 100 mol % of dimethylsiloxane unit Component (B-2): organopolysiloxane which has at least three hydrolyzable groups within one molecule thereof, is a partial hydrolysis condensate of MeSi(OMe)$_3$, and has 10 mPa·s of an absolute viscosity determined using a rotating viscometer at 25° C.

Component (B-3): dioctyl tin diacetate

The antistatic release agent according to the first aspect of the present invention preferably includes: a release component which is a silicone material containing a composition (C) shown below; a conductive component containing a complex of poly(3,4-ethylenedioxythiophene) and polystyrene sulfonate; and at least one organic solvent selected from the group consisting of toluene, methanol, ethanol, isopropanol, butanol, diacetone alcohol and methyl ethyl ketone; wherein, as an ion pair, at least one amine compound selected from the group consisting of trioctylamine, a compound represented by the aforementioned chemical formula I and a compound represented by the aforementioned chemical formula II is coordinated to or bonded to portion of anion groups of the polyanion.

(C): a composition (C) includes components (C-1) and (C-2) shown below.

Component (C-1): organopolysiloxane which has at least three hydrolyzable groups within one molecule thereof, and is represented by the aforementioned chemical formula III Component (C-2): dioctyl tin diacetate The method of producing a antistatic releasing agent of the first aspect of the present invention includes: forming a complex of a π-conjugated electrically conductive polymer and a polyanion; mixing the complex, at least one amine compound selected from the group consisting of a secondary amine, a tertiary amine and a quaternary ammonium salt, and an organic solvent such that at least one amine compound selected from the group consisting of a secondary amine, a tertiary amine and a quaternary ammonium salt as an ion pair is coordinated to or bonded to portion of anion groups of the polyanion in the complex to obtain a conductive component; and mixing an organic solvent, the conductive component and a release component containing a condensation-curing type organopolysiloxane to obtain an antistatic releasing agent. The reaction temperature when the complex of a π-conjugated electrically conductive polymer and a polyanion is formed is preferably –20 to 90° C., and more preferably –10 to 40° C. The reaction time is preferably 1 to 48 hours and more preferably 3 to 24 hours. The reaction is preferably conducted in water. After the reaction completed, it is preferable that the concentration of the complex relative to the total amount of solution is adjusted within the range from 0.1 to 5% by mass by removing oxidizing agents, residue of the catalyst using ultrafiltration method.

When at least one amine compound selected from the group constituting of a secondary amine, a tertiary amine and a quaternary amine as an ion pair is coordinated to or bonded to portion of anion groups of the polyanion in the complex, the temperature is preferably 5 to 60° C., more preferably 10 to 40° C. It is preferable that the concentration of the complex in the conductive component relative to the total amount of solution is adjusted within the range from 0.1 to 1% by mass by controlling the amount of the solvent.

When a conductive component, a condensation-curing type organopolysiloxane and solvent are mixed, the temperature is preferably 5 to 40° C., and more preferably 20 to 40° C.

<Antistatic Release Film>

The antistatic release film of the second aspect of the present invention contains: a base material composed of a plastic film or paper; and a release agent layer formed on at least one surface of the base material.

The release agent layer constituting the antistatic release film of the present invention is a layer formed from the antistatic release agent.

The thickness of the antistatic release film is preferably 2 to 500 μm, and more preferably 10 to 100 μm. In the other embodiment, the thickness is preferably 10 to 1,000 μm, and more preferably 50 to 300 μm. The expression "thickness of the antistatic release film" is the sum of the thickness of the base material and the release agent layer, and is determined using a known thickness gauge such as a dial gauge and an ultrasonic thickness gauge.

With respect to the antistatic release film, the thickness of the release agent layer is preferably 0.1 to 5.0 μm, and more preferably 0.1 to 2.0 μm. The expression "thickness of the release agent layer" is the thickness of the layer formed from the antistatic release agent and is determined by observation using scanning electron microscope (SEM) or transmission electron microscope (TEM), and analysis by actual measurement simulation using X-ray or lights of various wavelength, or direct measurement using a probe in accordance with stylus type measurement.

Examples of resin materials constituting a plastic film include polyethylene, polypropylene, polystyrene, polyvinyl chloride, polyvinyl alcohol, polyethylene terephthalate, polybutylene terephthalate, polyethylene naphthalate, polyacrylate, polycarbonate, polyvinylidene difluoride, polyarylates, styrene-based elastomer, polyester-based elastomer, polyether imides, polyether ether ketone, polyphenylene sulfide, polyarylate, polyimide, polycarbonate, cellulose triacetate and cellulose acetate propionate. Among these, in terms of transparency, flexibility, antifouling property and strength, polyethylene terephthalate is preferably used.

As paper, quality paper, kraft paper and coated paper can be used.

As the method of producing the antistatic release film, a method including: applying the antistatic releasing agent to at least one surface of the plastic film; and drying the antistatic releasing agent to form an antistatic releasing film.

As the method of applying the antistatic releasing agent, a method using a coating machine such as a bar coater, a gravure coater, an air knife coater, a roll coater, a wire bar can be employed. The coating amount is not particularly limited, but in general, the solid content is preferably within the range from 0.1 to 5.0 g/m$^2$.

As the method of drying the antistatic release agent, a method of removing the volatile components and solvent components by heating can be mentioned. Specifically, a hot air dryer, and an IR dryer can be mentioned. Otherwise, the antistatic release agent may be left at room temperature. The drying temperature is preferably 50 to 200° C., and more preferably 70 to 180° C. The drying time is preferably 1 to 120 seconds, and more preferably 5 to 90 seconds. In the other embodiment, the drying temperature is 80 to 200° C., more preferably 100 to 150° C. The drying time is preferably 0.5 to 10 minutes, and more preferably 0.5 to 2 minutes.

Since the antistatic release film of the second aspect of the present invention contains a release agent layer containing the antistatic release agent, and has excellent antistatic properties and release properties. Therefore, the antistatic releasing film of the present invention is preferably used as an adhesive sheet for optical parts or electronic and electrical parts.

The method for using the antistatic release film as an adhesive sheet includes allowing the antistatic release film to adhere to optical parts or electronic and electrical parts.

EXAMPLES

Although the following indicates examples and comparative examples of the present invention, the present invention is not limited to the following examples. In the following examples, "parts" means "parts by mass", and "%" means "% by mass".

Production Example 1

206 g of sodium styrene sulfonate were dissolved in 1000 ml of ion exchange water followed by adding thereto, a solution of 1.14 g of ammonium persulfate preliminarily dissolved in 10 ml of water in a dropwise manner over 20 minutes while stirring at 80° C., and further stirring the solution for 12 hours.

1000 ml of sulfuric acid diluted to 10% by mass was added to the resulting sodium styrene sulfonate-containing solution. Subsequently, about 1,000 ml of polystyrene sulfonate-containing solution were removed using ultrafiltration. Moreover, 2,000 ml of ion exchange water were added to the residual liquid, and about 2,000 ml of solution were removed using ultrafiltration. The aforementioned ultrafiltration procedure was repeated three times. Subsequently, 2,000 mL of ion exchange water were added to the obtained filtrate, and about 2,000 mL of solution were removed using ultrafiltration. The aforementioned ultrafiltration procedure was repeated three times and the water in the resulting solution was removed under reduced pressure to obtain polystyrene sulfonate in the form of a colorless solid. The mass average molecular mass of this polystyrene sulfonate was about 300,000.

Production Example 2

14.2 g of 3,4-ethylenedioxythiophene and a solution obtained by dissolving 36.7 g of the polystyrene sulfonate obtained in Production Example 1 in 2,000 ml of ion exchange water were mixed at 20° C.

While holding at 20° C., an oxidation catalyst solution obtained by dissolving 29.64 g of ammonium persulfate and 8.0 g of ferric sulfate in 200 ml of ion exchange water were slowly added to the resulting mixed solution while stirring. The reaction was allowed to proceed for 3 hours.

2,000 ml of ion exchange water were added to the resulting reaction liquid and about 2,000 ml of the solution were removed using ultrafiltration. This procedure was repeated three times.

Next, 200 ml of dilute sulfuric acid having a concentration of 10% by mass and 2,000 ml of ion exchange water were added to the treated liquid on which the aforementioned ultrafiltration was carried out, and about 2,000 ml of the treated liquid were removed using ultrafiltration. Subsequently, 2,000 ml of ion exchange water were further added to the solution, and about 2000 ml of liquid were removed using ultrafiltration. This procedure was repeated three times.

Moreover, 2,000 ml of ion exchange water were added to the resulting treated liquid and about 2,000 ml of the treated liquid were removed by ultrafiltration. This procedure was repeated five times to obtain an aqueous dispersion of about 1.2% by mass of polystyrene sulfonate-doped poly(3,4-ethylenedioxythiophene) (hereinafter, referred to as "PEDOT-PSS aqueous dispersion").

Production Example 3

1,000 g of the PEDOT-PSS aqueous dispersion was freeze-dried to obtain 12 g of powder of PEDOT-PSS. To the obtained 12.0 g of powder of PEDOT-PSS, 2,882 g of isopropanol and 10.6 g of trioctylamine were added and mixed to obtain an isopropanol dispersion of PEDOT-PSS (1) having a concentration of 0.4%.

Production Example 4

The isopropanol dispersion of PEDOT-PSS (2) having a concentration of 0.4% was prepared in the same manner as in the Production Example 3 except that 4.2 g of triethylamine was used instead of 10.6 g of trioctylamine.

Production Example 5

The isopropanol dispersion of PEDOT-PSS (3) having a concentration of 0.4% was prepared in the same manner as in the Production Example 3 except that 3.0 g of tripropylamine was used instead of 10.6 g of trioctylamine.

Production Example 6

The isopropanol dispersion of PEDOT-PSS (4) having a concentration of 0.4% was prepared in the same manner as in the Production Example 3 except that 3.0 g of mono-n-hexylamine was used instead of 10.6 g of trioctylamine.

Production Example 7

The isopropanol dispersion of PEDOT-PSS (5) having a concentration of 0.4% was prepared in the same manner as in the Production Example 3 except that 1.8 g of Ethomeen C25 (trade name, Lion Akzo Co., Ltd.) was used instead of 10.6 g of trioctylamine.

<Preparation of Release Agent>

A condensation-curing type organopolysiloxane used in the following examples will be explained as follows.

Condensation-Curing Type Organopolysiloxane C

Active ingredient: 20%; a mixture of an organic resin derivative and an alkoxy group-containing organopolysiloxane oil; in the condensation-curing type organopolysiloxane C, the amount of the organic resin derivative: 14% by mass; the amount of the alkoxy group-containing organopolysiloxane oil: 6% by mass; the amount of toluene: 55% by mass; and the amount of butanol: 25% by mass In the present specification, the term "active ingredient" refers to the component contained in the release component (excluding solvent).

The organic resin derivative is a compound in which portion of hydroxyl groups of cellulose has been etherified by an ethyl group.

The alkoxy group-containing organopolysiloxane oil is methylmethoxypolysiloxane which is a partial hydrolysis condensate of $MeSi(OMe)_3$ and has 10 mPa·s of viscosity. The compound has at least three OMe groups in one molecule.

Condensation-Curing Type Organopolysiloxane B1

Active ingredient: 50%; a mixture of a silanol group-containing organopolysiloxane oil and an alkoxy group-containing organopolysiloxane oil; in the condensation-curing type organopolysiloxane B1, the amount of the silanol group-containing organopolysiloxane oil: 45% by mass; the amount of the alkoxy group-containing organopolysiloxane oil: 5% by mass; and the amount of toluene: 50% by mass The silanol group-containing organopolysiloxane oil is an organopolysiloxane which has 800 mPa·s of a viscosity of 30% by mass toluene solution, determined using a rotating viscometer at 25° C., and has dimethylhydroxysiliy groups at the both terminals of main chain of the molecular chain, and has a main skeleton excluding the both units at the terminals, composed of 90 mol % of dimethylsiloxane unit and 10 mol % of diphenylsiloxane unit.

The alkoxy group-containing organopolysiloxane oil is a methylmethoxypolysiloxane which is a partial hydrolysis condensate of $MeSi(OMe)_3$ and has 10 mPa·s of viscosity. The compound has at least three OMe groups in one molecule.

Condensation-Curing Type Organopolysiloxane B2

Active ingredient: 30%; a mixture of a silanol group-containing organopolysiloxane gum and an alkoxy group-containing organopolysiloxane oil; in the condensation-curing type organopolysiloxane B2, the amount of the silanol group-containing organopolysiloxane gum: 24% by mass; the amount of the alkoxy group-containing organopolysiloxane oil: 6% by mass; and the amount of toluene: 70% by mass The silanol group-containing organopolysiloxane gum is an organopolysiloxane which has 15,000 mPa·s of a viscosity of 30% by mass toluene solution, determined using a rotating viscometer at 25° C., and has dimethylhydroxysiliy groups at the both terminals of main chain of the molecular chain, and has a main skeleton composed of 100 mol % of dimethylsiloxane unit.

The alkoxy group-containing organopolysiloxane oil is a methylmethoxypolysiloxane which is a partial hydrolysis condensate of $MeSi(OMe)_3$ and has a viscosity of 10 mPa·s. The compound has at least three OMe group in one molecule.

Condensation-Curing Type Organopolysiloxane A

Active ingredient: 30%; a mixture of a silanol group-containing organopolysiloxane gum and an SiH group-containing organopolysiloxane oil; in the condensation-curing type organopolysiloxane A, the amount of the silanol group-containing organopolysiloxane gum: 29% by mass; the amount of the SiH group-containing organopolysiloxane oil: 1% by mass; and the amount of toluene: 70% by mass The silanol group-containing organopolysiloxane gum is an organopolysiloxane which has 1,5000 mPa·s of a viscosity of 30% by mass toluene solution determined using a rotating viscometer at 25° C., and has dimethylhydroxysiliy groups at the both terminals of main chain of the molecular chain, and has a main skeleton composed of 100 mol % of dimethylsiloxane unit.

The SiH group-containing organopolysiloxane oil is an organopolysiloxane which has trimethysiliy groups at the both terminals of main chain of the molecular chain, has a main skeleton composed of 100 mol % of $MeHSiO_{2/2}$ unit relative to the total mole number of the structural units constituting the main skeleton, and has an absolute viscosity of 25 mPa·s, determined using a rotating viscometer at 25° C.

The viscosity was determined using TVB-10 type viscometer (manufactured by Told Sangyo Co., Ltd.).

Example 1

10.9 g of condensation-curing type organopolysiloxane C, 2.74 g of condensation-curing type organopolysiloxane B1 as condensation-curing type organopolysiloxanes and 0.5 g of dioctyl tin diacetate as a condensation catalyst were added to 30 g of isopropanol dispersion of PEDOT-PSS (1) obtained in Production Example 3. Then, the mixture was diluted with 45.86 g of methyl ethyl ketone and 10.0 g of diacetone alcohol, thereby obtaining a release agent (moisture content: 0.01%).

Example 2

10.0 g of condensation-curing type organopolysiloxane β2 as a condensation-curing type organopolysiloxane and 0.4 g of dioctyl tin diacetate as a condensation catalyst were added to 30 g of isopropanol dispersion of PEDOT-PSS (1) obtained in Production Example 3. Then, the mixture was diluted with 59.6 g of methyl ethyl ketone, thereby obtaining a release agent.

Example 3

A release agent was obtained in the same manner as in the Example 2, except that the condensation-curing type organopolysiloxane A was used as a condensation-curing type organopolysiloxane.

Example 4

0.3 g of dimethylsulfoxide was added to 100 g of the release agent of Example 1, thereby obtaining a release agent containing a conductive improver.

Example 5

A release agent containing a conductive improver was prepared in the same manner as in Example 4, except that ethylene glycol instead of dimethylsulfoxide was added to 100 g of the release agent of Example 1.

Example 6

A release agent containing a conductive improver was prepared in the same manner as in Example 5, except that 2-hydroxyethylacrylamide instead of dimethylsulfoxide was added to 100 g of the release agent of Example 1.

Example 7

A release agent containing a conductive improver was prepared by adding 0.3 g of ethyl lactate instead of dimethyl sulfoxide to 100 g of the release agent of Example 1.

Example 8

0.456 g of condensation-curing type organopolysiloxane B1 as a condensation-curing type organopolysiloxane and 0.018 g of dioctyl tin diacetate as a condensation catalyst were added to 170 g of isopropanol dispersion of PEDOT-PSS (1) obtained in Production Example 3. Then, the mixture was diluted with 45.86 g of methyl ethyl ketone and 10.0 g of diacetone alcohol, thereby obtaining a release agent.

Example 9

A release agent was obtained in the same manner as in the Example 8, except that the amount of isopropanol dispersion of PEDOT-PSS (1) was changed to 120 g.

Example 10

A release agent was obtained in the same manner as in the Example 8, except that the amount of isopropanol dispersion of PEDOT-PSS (1) was changed to 60 g.

Example 11

A release agent was obtained in the same manner as in the Example 1, except that the amount of the condensation-curing type organopolysiloxane C was changed to 0.568 g, the amount of the condensation-curing type organopolysiloxane B1 was changed to 0.143 g, and the amount of dioctyl tin diacetate was changed to 0.028 g.

Example 12

A release agent was obtained in the same manner as in the Example 1, except that the amount of the condensation-curing type organopolysiloxane C was changed to 1.09 g, the amount of the condensation-curing type organopolysiloxane B1 was changed to 0.247 g, and the amount of dioctyl tin diacetate was changed to 0.054 g.

Example 13

A release agent was obtained in the same manner as in the Example 1, except that the amount of the condensation-curing type organopolysiloxane C was changed to 2.18 g, the amount of the condensation-curing type organopolysiloxane B1 was changed to 0.548 g, and the amount of dioctyl tin diacetate was changed to 0.108 g.

Example 14

A release agent was obtained in the same manner as in the Example 1, except that the amount of the condensation-curing type organopolysiloxane C was changed to 4.36 g, the amount of the condensation-curing type organopolysiloxane B1 was changed to 1.096 g, and the amount of dioctyl tin diacetate was changed to 0.216 g.

Example 15

A release agent was obtained in the same manner as in the Example 1, except that the amount of the isopropanol dispersion of PEDOT-PSS (1) in Example 2 was changed to 20 g.

Example 16

A release agent was obtained in the same manner as in the Example 1, except that the amount of the isopropanol dispersion of PEDOT-PSS (1) in Example 2 was changed to 15 g.

Example 17

A release agent was obtained in the same manner as in the Example 1, except that the amount of the isopropanol dispersion of PEDOT-PSS (1) in Example 2 was changed to 10 g.

Example 18

10.9 g of condensation-curing type organopolysiloxane C and 2.74 g of condensation-curing type organopolysiloxane B1 as condensation-curing type organopolysiloxanes and 0.5 g of dioctyl tin diacetate as a condensation catalyst were added to 30 g of isopropanol dispersion of PEDOT-PSS (5) obtained in Production Example 7. Then, the mixture was diluted with 45.86 g of methyl ethyl ketone and 10.0 g of diacetone alcohol, thereby obtaining a release agent.

Example 19

3 g of the compound represented by chemical formula III shown below as a condensation-curing type organopolysiloxane and 0.5 g of dioctyl tin diacetate as a condensation catalyst were added to 30 g of isopropanol dispersion of PEDOT-PSS (1) obtained in Production Example 3. Then, the mixture was diluted with 45.86 g of methyl ethyl ketone and 10.0 g of diacetone alcohol, thereby obtaining a release agent.

[Chemical Formula 5]

Chemical Formula III

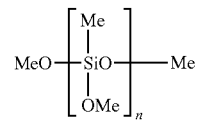

(n represents a positive number of 2 to 4)

Comparative Example 1

10.9 g of condensation-curing type organopolysiloxane C and 2.74 g of condensation-curing type organopolysiloxane B1 as condensation-curing type organopolysiloxanes and 0.5 g of dioctyl tin diacetate as a condensation catalyst were weighed. Then, 45.86 g of methyl ethyl ketone and 10.0 g of diacetone alcohol were added so as to adjust the solid content to 3% by mass, thereby obtaining a release agent.

Comparative Example 2

10 g of condensation-curing type organopolysiloxane B2 and 0.4 g of dioctyl tin diacetate were weighed. Then 59.6 g of methyl ethyl ketone was added, thereby obtaining a release agent.

Comparative Example 3

A release agent was prepared in the same manner as in Comparative Example 2, except that the condensation-curing type organopolysiloxane A was used instead of the condensation-curing type organopolysiloxane B2.

Comparative Example 4

A release agent was prepared in the same manner as in Example 1, except that the amount of the isopropanol dispersion of PEDOT-PSS in Example 8 was changed to 190 g.

Comparative Example 5

A release agent was prepared in the same manner as in Example 1, except that the amount of the isopropanol dispersion of PEDOT-PSS in Example 2 was changed to 5 g.

Comparative Example 6

A release agent was prepared in the same manner as in Example 1, except that isopropanol dispersion of PEDOT-PSS (2) was used instead of isopropanol dispersion of PEDOT-PSS (1).

Comparative Example 7

A release agent was prepared in the same manner as in Example 1, except that isopropanol dispersion of PEDOT-PSS (3) was used instead of isopropanol dispersion of PEDOT-PSS (1).

Comparative Example 8

A release agent was prepared in the same manner as in Example 1, except that isopropanol dispersion of PEDOT-PSS (4) was used instead of isopropanol dispersion of PEDOT-PSS (1).

<Evaluation>

With respect to each release agent, curable properties, force required peeling (hereinafter, referred to as "peel strength"), residual adhesion ratio, and surface resistivity were evaluated and measured by the following method. The results are shown in Table 1.

[Curing Properties]

The obtained release agent was applied to a PET film having a thickness of 38 μm using barcoater, and heated at 120° C. for 1 minute in a hot air drier to form a release agent layer. The release agent layer was rubbed with a finger ten times, and the existence or non-existence of cloud or defect was visually observed, and evaluated in accordance with following criteria.

A: cloud and rub-off were not observed.
B: cloud and rub-off were observed.

[Peel Strength]

A release agent layer was formed in the same manner as in the [curing properties], and polyester adhesion tape (product name: nitto-31B, manufactured by Nitto Denko Corporation) was laminated on the surface of the release agent layer, and a load of 1976Pa was applied to the adhesion tape so as to adhere the polyester adhesion tape to the release agent layer. Using a tensile testing machine, the polyester adhesion tape was peeled from the release agent layer such that the angle between the polyester adhesion tape and the release agent layer became 180° (peeling speed: 0.3 m/min), and then, peel strength was measured. As the peel strength is smaller, the adhesion sheet can be easily peeled after the adhesion sheet is adhered to the release agent layer. That is, the adhesive sheet becomes a film having easy-peeling properties.

[Residual Adhesion Ratio (Subsequent Adhesion Ratio)]

A polyester adhesion tape was laminated on the release agent layer in the same manner as in the measurement of peel strength. Then, the laminated structure was left at room temperature for 20 hours, or the laminated structure was subjected to heat treatment at 85° C. for 20 hours. Next, the polyester adhesion tape was peeled from the release agent layer. The peeled polyester adhesion tape was adhered to a stainless panel. Thereafter, using a tensile testing machine, the polyester adhesion tape was peeled from the stainless panel and then, peel strength X was measured.

A polyester adhesion tape that had not been adhered to a release agent layer was adhered to a stainless board, and using a tensile testing machine, the polyester adhesion tape was peeled from the stainless board and then, peel strength Y was measured.

In accordance with the formula (peel strength X/peel strength Y)×100(%), residual adhesion ratio was calculated.

As the residual adhesion ratio becomes larger, the release properties the release agent layer becomes excellent, and deterioration of adhesion properties of polyester adhesion sheet which had been adhered to the release agent layer can be suppressed.

[Surface Resistivity]

Using Hiresta MCP-HT450 manufactured by Mitsubishi Chemical Corporation and a probe MCP-HTP12, surface resistivity was measured under applied voltage of 10V. The result "OVER" in Table means that surface resistivity was too high to measure it. The expression "Ω/☐" means "Ω/sq.".

With respect to Comparative Examples 6 and 7 in which the substituent of the amine compound coordinated to or bonded to the surplus sulfonate groups within a polystyrene sulfonate had less than 4 of carbon atoms, the liquid was not stable, the conductive complex was incompatible with a silicon resin and therefore, uniform film could not be formed. As a result, surface resistivity could not be measured.

With respect to Comparative Example 8 in which the number of the substituent of the amine compound coordinated to or bonded to the surplus sulfonate groups within polystylene sulfonate was 1 (that is, the amine compound was a primary amine), the liquid was not stable, the conductive complex was incompatible with a silicon resin and therefore, uniform film could not be formed. As a result, surface resistivity could not be measured.

TABLE 1

| | Amount of Conductive component (parts) | Condensation-curing type organopolysiloxane | Curing properties | Room temperature, 20 hours | | 85° C., 20 hours | | Surface resistivity (Ω/☐) |
|---|---|---|---|---|---|---|---|---|
| | | | | Peel strength (N/25 mm) | Residual adhesion ratio (%) | Peel strength (N/25 mm) | Residual adhesion ratio (%) | |
| Example 1 | 3.4 | Composition (B) | A | 0.04 | 90 | 0.09 | 83 | $1 \times 10^{10}$ |
| Example 2 | 4.0 | Composition (B) | A | 0.03 | 73 | 0.06 | 62 | $1 \times 10^{8}$ |
| Example 3 | 4.0 | Composition (A) | A | 0.04 | 67 | 0.05 | 61 | $1 \times 10^{8}$ |
| Example 4 | 3.4 | Composition (B) | A | 0.05 | 90 | 0.15 | 80 | $2 \times 10^{8}$ |
| Example 5 | 3.4 | Composition (B) | A | 0.05 | 89 | 0.16 | 79 | $3 \times 10^{9}$ |
| Example 6 | 3.4 | Composition (B) | A | 0.05 | 90 | 0.15 | 80 | $3 \times 10^{8}$ |
| Example 7 | 3.4 | Composition (B) | A | 0.05 | 88 | 0.14 | 81 | $2 \times 10^{8}$ |
| Example 8 | 298.3 | Composition (B) | A | 5.14 | 79 | 5.32 | 59 | $5 \times 10^{5}$ |
| Example 9 | 210.5 | Composition (B) | A | 3.43 | 78 | 3.86 | 61 | $3 \times 10^{5}$ |
| Example 10 | 105.3 | Composition (B) | A | 2.83 | 82 | 2.90 | 65 | $2 \times 10^{6}$ |
| Example 11 | 64.8 | Composition (B) | A | 2.50 | 86 | 2.50 | 68 | $3 \times 10^{7}$ |
| Example 12 | 33.8 | Composition (B) | A | 1.50 | 87 | 1.50 | 70 | $4 \times 10^{7}$ |
| Example 13 | 16.9 | Composition (B) | A | 0.40 | 96 | 1.00 | 80 | $3 \times 10^{8}$ |
| Example 14 | 8.5 | Composition (B) | A | 0.06 | 91 | 0.25 | 82 | $2 \times 10^{9}$ |
| Example 15 | 2.6 | Composition (B) | A | 0.03 | 87 | 0.05 | 76 | $3 \times 10^{7}$ |
| Example 16 | 2.0 | Composition (B) | A | 0.03 | 87 | 0.05 | 76 | $3 \times 10^{8}$ |
| Example 17 | 1.3 | Composition (B) | A | 0.03 | 87 | 0.05 | 76 | $7 \times 10^{10}$ |
| Example 18 | 3.4 | Composition (B) | A | 0.06 | 90 | 0.19 | 79 | $3 \times 10^{9}$ |
| Example 19 | 3.4 | Composition (C) | A | 5.34 | 87 | 7.40 | 76.5 | $2 \times 10^{7}$ |
| Comparative Example 1 | 0.0 | Composition (B) | A | 0.04 | 90 | 0.09 | 84 | OVER |
| Comparative Example 2 | 0.0 | Composition (B) | A | 0.04 | 73 | 0.06 | 62 | OVER |
| Comparative Example 3 | 0.0 | Composition (A) | A | 0.04 | 76 | 0.05 | 62 | OVER |
| Comparative Example 4 | 333.3 | Composition (B) | A | 10.19 | 56 | 6.90 | 22.8 | $5 \times 10^{5}$ |
| Comparative Example 5 | 0.7 | Composition (B) | A | 0.04 | 87 | 0.05 | 76 | OVER |
| Comparative Example 6 | 3.4 | Composition (B) | A | 0.06 | 89 | 0.17 | 79 | OVER |
| Comparative Example 7 | 3.4 | Composition (B) | A | 0.05 | 87 | 0.2 | 76 | OVER |
| Comparative Example 8 | 3.4 | Composition (B) | A | 0.06 | 93 | 0.16 | 83 | OVER |

With respect to the release agents according to Examples 1 to 19, peel strength was low, and surface resistivity was low. With respect to Comparative Examples 1 to 3 which did not contain the conductive component and Comparative Example 5 in which the amount of conductive component was too small, surface resistivity was too high to measure the value.

With respect to Comparative example 4 in which the amount of the conductive component was too large and the amount of the release component was relatively too small, surface resistivity was high.

INDUSTRIAL APPLICABILITY

The antistatic release agent and antistatic release film are superior in both antistatic properties and release properties, and useful in industrial prospective.

The invention claimed is:

1. An antistatic release agent comprising:
   a release component that contains a condensation-curing type organopolysiloxane;

a conductive component that contains a complex of a π-conjugated electrically conductive polymer and a polyanion; and an organic solvent; wherein the amount of the conductive component relative to 100 parts by mass of the release component is 1 to 300 parts by mass, at least one amine compound selected from the group consisting of a secondary amine, a tertiary amine or a quaternary ammonium salt is coordinated to or bonded to a portion of anion groups in the polyanion as an ion pair, the amine compound has one or more substituent selected from the group consisting of an alkyl group having 4 or more carbon atoms, an aryl group, an aralkyl group, an alkylene group, an arylene group, an aralkylene group and an oxyalkylene group, and the amount of the portion of anion groups relative to the total anion groups in the polyanion is 30 to 90 mol %.

2. An antistatic release film comprising:

a base composed of a plastic film or paper; and a release agent layer formed on at least one surface of the base; wherein the release agent layer is formed from an antistatic release agent of claim 1.

3. The antistatic release agent according to claim 1, wherein the release component is a silicone material containing at least one composition selected from the group consisting of compositions (A) to (C), wherein the composition (A) includes components (A-1) to (A-3), the component (A-1) is an organopolysiloxane having at least two hydroxyl groups within one molecule thereof, the component (A-2) is an organopolysiloxane having at least three SiH groups within one molecule thereof, and the component (A-3) is a condensation catalyst;

the composition (B) includes components (B-1) to (B-3), the component (B-1) is an organopolysiloxane having at least two hydroxyl groups within one molecule thereof, the component (B-2) is an organopolysiloxane having at least three hydrolyzable groups within one molecule thereof, and the component (B-3) is a condensation catalyst; and the composition (C) includes components (C-1) and (C-2), the component (C-1) is an organopolysiloxane having at least three hydrolyzable groups within one molecule thereof, and the component (C-2) is a condensation catalyst.

4. The antistatic release agent according to claim 3, wherein the release component is a silicone material containing the composition (A).

5. The antistatic release agent according to claim 4, wherein the component (A-1) is an organopolysiloxane which has at least two hydroxyl groups within one molecule thereof, and is represented by any one of formulae (1-1) to (1-3) shown below;

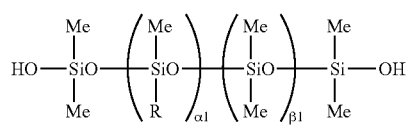

(1-1)

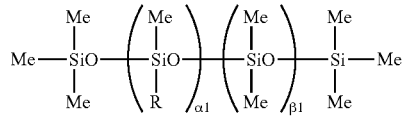

(1-2)

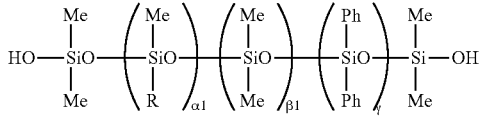

(1-3)

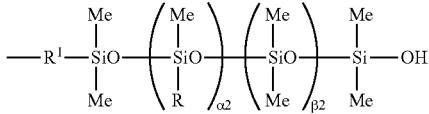

(2-1)

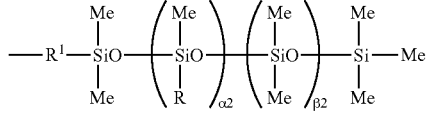

(2-2)

wherein Me represents a methyl group; Ph represents a phenyl group; R represents a hydroxyl group, a monovalent hydrocarbon group having 1 to 20 carbon atoms or a siloxane residue represented by general formula (2-1) or (2-2); $R^1$ represents an oxygen atom or an alkylene group having 1 to 6 carbon atoms; α1 represents an integer of 0 to 1,000; β1 represents an integer of 50 to 9,000; α2 represents an integer of 0 to 900; β2 represents an integer of 0 to 9,000; and γ represents an integer of 1 to 3,000.

6. The antistatic release agent according to claim 4, wherein the component (A-2) is an organohydrogenpolysiloxane which has at least three SiH groups within one molecule thereof and is represented by any one of formulae (3-1) to (3-5) shown below;

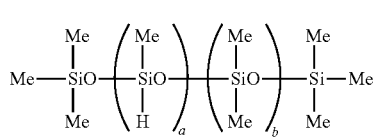

(3-1)

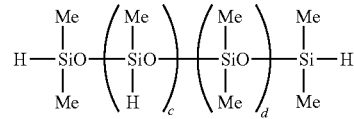

(3-2)

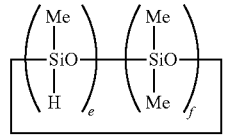

(3-3)

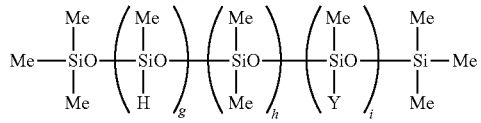

(3-4)

-continued

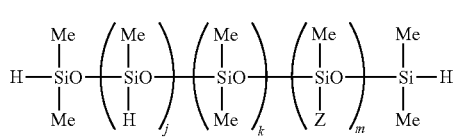

(3-5)

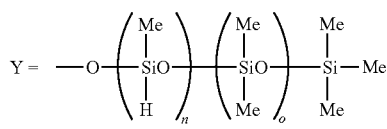

(4-1)

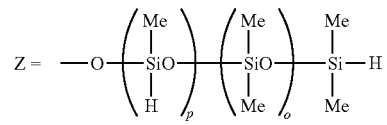

(4-2)

wherein Me represents a methyl group; Y represents a group represented by general formula (4-1); Z represents a group represented by general formula (4-2); a and e each independently represents an integer of 3 to 500; c represents an integer of 1 to 500; and b, d, f, g, h, i, j, k, m, n, o, p and q each independently represents an integer of 0 to 500.

7. The antistatic release agent according to claim 4, wherein the component (A-1) is an organopolysiloxane which has at least two hydroxyl groups within one molecule thereof, has 50 to 100,000 mPa·s of a viscosity of 30% by mass toluene solution, determined using a rotating viscometer at 25° C., and has dimethylhydroxysiliy groups at the both terminals of main chain of the molecular chain and has a main skeleton containing 90 to 100 mol % of dimethylsiloxane unit and 0 to 10 mol % of diphenylsiloxane unit.

8. The antistatic release agent according to claim 4, wherein the component (A-2) is an organopolysiloxane which has at least three SiH groups within one molecule thereof, has trimethylsilyl groups at the both terminals of main chain of molecular chain, has a main skeleton containing 10 to 100 mol % of MeHSiO$_{2/2}$ unit relative to the total mole number of the structural units constituting the main skeleton, and has 2 to 1,000 mPa·s of an absolute viscosity determined using a rotating viscometer at 25° C.

9. The antistatic release agent according to claim 3, wherein
the release component is a silicone material containing the composition (B).

10. The antistatic release agent according to claim 9, wherein
the component (B-1) is an organopolysiloxane which has at least two hydroxyl groups within one molecule thereof, and is represented by any one of formulae (1-1) to (1-3) shown below;

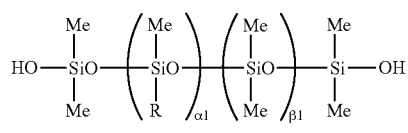

(1-1)

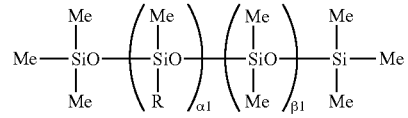

(1-2)

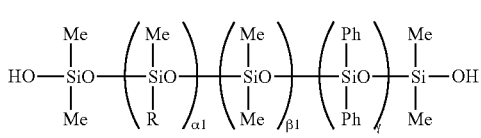

(1-3)

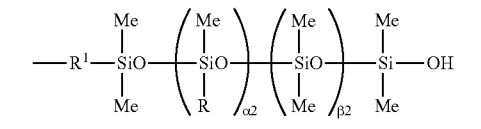

(2-1)

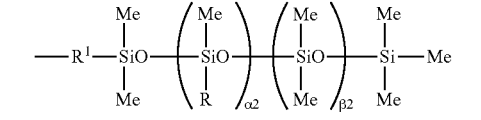

(2-2)

wherein Me represents a methyl group; Ph represents a phenyl group; R represents a hydroxyl group, a monovalent hydrocarbon group having 1 to 20 carbon atoms or a siloxane residue represented by general formula (2-1) or (2-2); R$^1$ represents an oxygen atom or an alkylene group having 1 to 6 carbon atoms; α1 represents an integer of 0 to 1,000; β1 represents an integer of 50 to 9,000; α2 represents an integer of 0 to 900; β2 represents an integer of 50 to 9,000; and γ represents an integer of 1 to 3,000.

11. The antistatic release agent according to claim 9, wherein
the component (B-2) is an organopolysiloxane which has at least three hydrolyzable groups within one molecule thereof and is represented by any one of formulae (5-1) to (5-4) shown below;

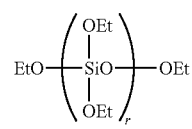

(5-1)

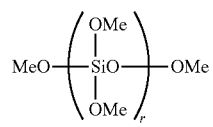

(5-2)

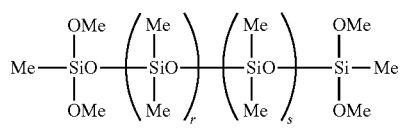

(5-3)

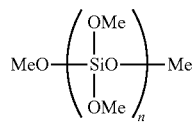

(5-4)

wherein r represents an integer of 1 to 200; s represents an integer of 1 to 200; and n represents an integer of 1 to 10.

12. The antistatic release agent according to claim 9, wherein the component (B-1) is an organopolysiloxane which has at least two hydroxyl groups within one molecule thereof, has 50 to 100,000 mPa·s of a viscosity of 30% by mass toluene solution, determined using a rotating viscometer at 25° C., and has dimethylhydroxysiliy groups at the both terminals of main chain of the molecular chain, and has a main skeleton containing 90 to 100 mol % of dimethylsiloxane unit and 0 to 10 mol % of diphenylsiloxane unit.

13. The antistatic release agent according to claim 9, wherein the component (B-2) is an organopolysiloxane which has at least three hydrolyzable groups within one molecule thereof, and is a partial hydrolysis condensate of MeSi(OMe)$_3$, and has 1 to 100mPa·s of an absolute viscosity determined using a rotating viscometer at 25° C.

14. The antistatic release agent according to claim 3, wherein
the release component is a silicone material containing the composition (C).

15. The antistatic release agent according to claim 14, wherein
the component (C-1) is an organopolysiloxane which has at least three hydrolyzable groups within one molecule thereof and is represented by any one of formulae (5-1) to (5-4) shown below;

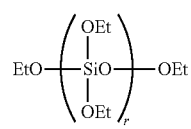
(5-1)

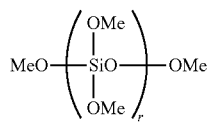
(5-2)

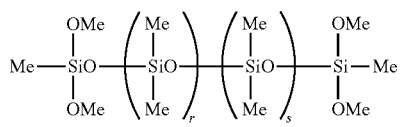
(5-3)

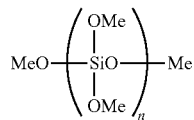
(5-4)

wherein r represents an integer of 1 to 200; s represents an integer of 1 to 200; and n represents an integer of 1 to 10.

16. The antistatic release agent according to claim 14, wherein the component (C-1) is an organopolysiloxane which has at least three hydrolyzable groups within one molecule thereof, and is a partial hydrolysis condensate of MeSi(OMe)$_3$, and has 1 to 100mPa·s of an absolute viscosity determined using a rotating viscometer at 25° C.

* * * * *